United States Patent [19]

Abdel-Malik et al.

[11] Patent Number: 5,882,702
[45] Date of Patent: Mar. 16, 1999

[54] PROCESS FOR THE FORMATION OF PLASTICIZED PROTEINACEOUS MATERIALS AND COMPOSITIONS CONTAINING THE SAME

[75] Inventors: Magdy Malak Abdel-Malik, Chester; Nick Steve D'Ottavio, Hackettstown; Vipul Bhupendra Davé, Summit, all of N.J.; Arun Vishwanathan, Yardley, Pa.

[73] Assignee: Warner-Lambert Company, Morris Plains, N.J.

[21] Appl. No.: 936,570

[22] Filed: Sep. 24, 1997

Related U.S. Application Data

[60] Provisional application No. 60/027,509 Oct. 7, 1996.

[51] Int. Cl.⁶ .............................. A23G 3/30; A23J 1/00; G01N 33/00
[52] U.S. Cl. ............................. 426/3; 426/656; 426/660; 436/86
[58] Field of Search ................................ 426/660, 656, 426/3, 519, 512; 436/86

[56] References Cited

U.S. PATENT DOCUMENTS

| | | |
|---|---|---|
| 1,700,387 | 1/1929 | Stetson . |
| 2,154,482 | 4/1939 | Weber ........................ 99/138 |
| 2,461,829 | 2/1949 | Lowen . |
| 2,469,861 | 5/1949 | Cohoe . |
| 2,489,147 | 11/1949 | Lougovoy . |
| 2,586,675 | 2/1952 | Lutz .......................... 99/135 |
| 3,102,031 | 8/1963 | MacAllister et al. .................. 99/14 |
| 3,814,815 | 6/1974 | Hashimoto et al. . |
| 3,968,268 | 7/1976 | Sair et al. . |
| 4,338,340 | 7/1982 | Morimoto et al. . |
| 4,479,969 | 10/1984 | Bakal et al. . |
| 4,683,256 | 7/1987 | Porter et al. ............................ 524/285 |
| 4,863,745 | 9/1989 | Zibell . |
| 4,975,287 | 12/1990 | Zibell . |
| 5,286,501 | 2/1994 | Song et al. .................................. 426/3 |
| 5,366,740 | 11/1994 | Shaw et al. .................................. 426/3 |
| 5,424,081 | 6/1995 | Owusu-Ansah et al. .................... 426/4 |
| 5,482,722 | 1/1996 | Cook ........................................... 426/3 |
| 5,523,293 | 6/1996 | Jane et al. . |
| 5,543,164 | 8/1996 | Krochta et al. .......................... 426/302 |
| 5,580,590 | 12/1996 | Hartman . |

FOREIGN PATENT DOCUMENTS

| | | |
|---|---|---|
| 0425081 | 8/1990 | European Pat. Off. . |
| 53-012454 | 2/1978 | Japan . |
| 018052 | 4/1983 | Japan . |
| 211828 | 8/1990 | Japan . |
| 5171049 | 9/1993 | Japan . |
| 7163300 | 6/1995 | Japan . |
| 9628041 | 9/1996 | WIPO . |

*Primary Examiner*—Nina Bhat
*Attorney, Agent, or Firm*—Linda A. Vag

[57] ABSTRACT

Process for the formation of a plasticized proteinaceous material in which a plasticizer component is selectively matched with a protein component to form a blend. The blend is heated under controlled shear conditions to produce the plasticized proteinaceous material having the plasticizer component uniformly distributed within the protein component. The plasticized proteinaceous material is used for a variety of purposes including the production of gums and confectionery compositions.

54 Claims, No Drawings

PROCESS FOR THE FORMATION OF PLASTICIZED PROTEINACEOUS MATERIALS AND COMPOSITIONS CONTAINING THE SAME

This application claims benefit under 35 U.S.C. 119(e) of U.S. Provisional Application 60/027,509 filed Oct. 7, 1996.

BACKGROUND OF THE INVENTION

1. Field of the Invention

The invention relates to the formation of plasticized proteinaceous materials and compositions containing the same especially for the preparation of chewing gums and confectionery compositions. The plasticized proteinaceous materials have properties that enable them to replace one or more conventional ingredients in chewing gums and confectionery compositions to provide products which are edible and/or biodegradable.

The plasticized proteinaceous material is made by first combining at least one protein and at least one plasticizer which have been matched according to desirable criteria. The solid state combination is then treated under heat and controlled shear conditions to produce a plasticized proteinaceous material having unique properties, that is especially suitable for gums and confectionery compositions.

2. Description of the Prior Art

Proteins are polypeptide chains of amino acids having molecular weights of from about 5,000 up to and including several million. All proteins are constructed from the same set of twenty amino acids. The side-chains of these amino acids differ in size, shape, charge, hydrogen-bonding capacity and chemical reactivity. Thus, different proteins may exhibit different chemical and physical properties.

Although many proteins may have similar amino acid compositions, the sequence of amino acids is unique to each protein. The polypeptide chains of proteins can be folded in specific ways, depending on their amino acid sequences. The structure of the proteins themselves is determined and maintained by interactions between the different amino acids that form the polypeptide. The specific linear sequence of amino acid residues that determines the native biologically active structure is influenced by environmental conditions. The diversity in protein structures and functions signifies that the relative importance of intrinsic properties in polypeptides and proteins depend upon each of the individual proteins.

The chemical and physical forces, both covalent and noncovalent that generally determine the structure and specific conformations adopted by proteins include covalent bonds, hydrogen bonds, electrostatic interactions, hydrophobic interactions and weak, nonspecific attractive and repulsive forces.

Proteins are held in their respective conformations by a number of different interactions, such as hydrophobic interactions, hydrogen bonding, ion-pair interactions, metal ion coordinations, and van der Waals interactions. The cross linking of various portions of proteins by the formation of disulfide bonds between pairs of amino acid residues can also impact the conformations of proteins.

The three dimensional structure adopted by proteins in solution is a result of all of the above-mentioned interactions. The structure may also be changed by altering the temperature or the solution conditions. Heat, pH and changes in solvent conditions can lead to conformational changes which cause proteins to denature and lose their native structures. The denaturation of proteins is typically irreversible. Naturally, these changes lead to changes in the properties of proteins, which may be either beneficial or detrimental to the formation of a product.

Denaturation is the most unique property of proteins since no other natural polymer can be denatured. Denaturation is defined herein as "any modification of the secondary, tertiary or quaternary structure of a protein molecule, that does not break covalent bonds". A change in the protein structure is usually associated with some changes in at least one of the physical, chemical or functional properties of the protein. The denaturation of proteins is often thought of as a two-state process, so that proteins are either in the state of native conformation or in the state of denaturation. It is now clear, however, that this is an oversimplification, since there are believed to be several additional intermediate states that proteins assume.

The degree of change in the structure of proteins and thus in their properties, depends on the nature of the individual protein itself, as well as on the type and extent of denaturation. Very little is known about the intermediate states of protein structure. It is possible that the intermediate states may have different degrees of reactivity compared to the fully denatured protein. However, it is clear that proteins may react in three ways upon denaturation: (a) no alteration in molecular weight despite change in shape, (b) dissociation into sub-units of definite uniform size, and (c) aggregation.

A typical denaturation may occur without alteration in molecular weight and it is not always certain that dissociation or depolarization of a protein is accompanied by denaturation. Aggregation of proteins, however, most commonly occurs as a result of heating and may be averted by the presence of denaturants. The process of aggregation is difficult to control and is sensitive to environmental factors such as pH, ionic strength and solvent composition, and also depends on the time and rate of heating but does not give a linear time-dosage response. Aggregation therefore is a secondary phenomenon dependent on the electrokinetic potential of the denatured protein molecules.

The nature of proteins in the state of aggregation may be the most important property of proteins in terms of their functionality. The forces that govern the interactions between protein molecules to allow the formation of aggregates is believed to be the same as those forces that act to create the secondary and tertiary structures of the individual molecules.

The degree of change in structure and thus the properties of proteins depend in part on the manner in which proteins are denatured. Among the most important changes in proteins as a result of denaturation are: (1) decrease in solubility, (2) loss of biological activity, (3) increase in reactivity of constituents groups, and (4) changes in molecular shape and size.

Denaturation can be brought about by the application of physical, chemical and biological methods. Physical methods include heating, freezing, application of surface forces, sound waves, grinding, pressure, and radiation including ultraviolet and ionization radiation. Chemical methods include employing chemical agents such as solvents, pH adjusters, and salts. Biological methods include the use of proteolytic enzymes.

Protein denaturation brought about by heating, usually at 55° to 75° C., conventionally requires the use of a solvent to, inter alia, avoid concomitant decomposition of the polypeptide chain, and to preferably provide a dilute solution to avoid intermolecular interactions of the denatured protein. Aqueous, non-aqueous and aqueous-alcohol solutions have all been used.

A general discussion of proteins including classifications of proteins may be found in John M. deMan, "Principles Of Food Chemistry" $2^{nd}$ Edition, Van Nostrand Reinhold, New York, N.Y., (1990) at pages 89 & ff, and Grant & Hackh's Chemical Dictionary, $5^{th}$ Edition, McGraw-Hill, Inc., New York, N.Y. (1987) pages 477–478, each of which is incorporated herein by reference.

Chewing gums are traditionally comprised of a water insoluble base portion and a water soluble portion which contains flavors and sweeteners. The base portion includes a gum base part which includes a masticatory substance which imparts the chew characteristics to the final product. The gum base typically defines the release profile of flavors, and sweeteners and plays a significant role in the gum product. The flavors and sweeteners provide the sensory appeal aspects of the chewing gum.

Chewing gum bases conventionally contain materials called elastomers which provide the bounce or rubber character to the gum. Elastomers are water-insoluble polymers, both natural, such as natural rubbers and chicle, and synthetic polymers, such as styrene butadiene copolymers, polyisobutylene, polyethylene and the like. The elastomers are usually combined with polyvinyl acetates (PVAc) of varying molecular weight to provide stretch or elasticity to the gum base. Conventional gums will also contain materials such as resins which are used as elastomer solvents to soften the elastomer; waxes; fats and/or oils which can act as plasticizers; fillers and optionally, antioxidants and emulsifiers.

Conventional ingredients and techniques for the manufacture of chewing gums are known such as described in Sugar Confectionery Manufacture, $2^{nd}$ Edition, E. B. Jackson, editor, Blackie Academic & Professional, Glasgow, NZ (1995), at pages 259–286, incorporated herein by reference.

Conventional ingredients and techniques for the manufacture of confectionery compositions such as, for example, nougats are disclosed in "Choice Confections", Walter Richmond, Chapter 14, page 250, Manufacturing Confectionery Publishing Company (1954), incorporated herein by reference.

Native proteins, due to their general lack of flexibility, do not exhibit or mimic properties of gum base or confectionery ingredients such as elasticity, extensibility and chewability. Denatured proteins have been used in chewing gums but the art has not provided protein-based gums on a sensory level with conventional gums. For example, U.S. Pat. No. 5,482, 722 discloses a proteinaceous chewable base for use with confectionery products in which prolamine is dissolved in an alcohol/water solvent system and a texturizing agent is added to form a precipitate with the texturizing agent entrapped therein.

While such systems can be used to form proteinaceous materials that can be substituted for elastomers conventionally used in gums and confectionery compositions, such materials still do not effectively convey the same sensory properties that are associated with conventional chewing gums and confectionery products.

It would therefore be a significant advance in the art of developing gums and confectionery products to provide such products with proteinaceous materials as defined herein and to endow such products with the same or similar sensory characteristics as conventional gums and confectionery products.

It would be a further advance in the art to provide proteinaceous materials which have the properties of one or more ingredients of conventional gums and confectionery products such as elastomers, PVAc, waxes and the like, and which can be used in chewing gums and confectionery products as substitutes for one or more conventional ingredients. It would also be desirable to provide chewing gums and confectionery products based on proteinaceous materials which provide the sensation of a traditional gum or confectionery product, which can be eaten like food and digested, and/or which are biodegradable.

SUMMARY OF THE INVENTION

The present invention is in part directed to plasticized proteinaceous materials which are derived from the combination or blend of at least one protein (i.e. a protein component) and at least one plasticizer (i.e. a plasticizer component) which have been matched so that the end product (plasticized proteinaceous material) can be used for a variety of purposes and is especially suited for use in gums and confectionery compositions.

The present invention is also directed to the formation of plasticized proteinaceous materials from the blend. The blend is preferably heated under controlled shear conditions to produce a plasticized proteinaceous material which can replace one or more conventional ingredients of chewing gums and confectionery compositions such as elastomers, waxes, resins and polyvinyl acetate (PVAc) while imparting desired properties to the product as well as making the product edible and/or biodegradable.

More specifically, the present invention is directed, in part, to a plasticized proteinaceous material comprised of at least one protein (protein component) and at least one plasticizer (plasticizer component) wherein a solid state blend of the protein and plasticizer components is heated under controlled shear conditions at a temperature of from about 20° C. to about 140° C.

In another aspect of the invention there is provided a method of producing a blend of a protein component and a plasticizer component suitable for forming a plasticized proteinaceous material comprising:

a) selecting a protein or mixture of proteins (protein component) having a first solubility parameter defined by the Formula (I)

$$\delta_1^2 = \delta_{D1}^2 + \delta_{P1}^2 + \delta_{H1}^2 \quad (I)$$

wherein $\delta_1$ is the total solubility parameter value of the protein or mixture thereof, $\delta_{D1}$ is the solubility parameter value contributed by the dispersive forces of the protein or mixture thereof, $\delta_{P1}$ is the solubility parameter value contributed by the polar forces of the protein or mixture thereof, $\delta_{H1}$ is the solubility parameter value contributed by hydrogen bonding of the protein or mixture thereof, b) selecting a plasticizer or mixture of plasticizers (plasticizer component) having a second solubility parameter defined by the Formula (II)

$$\delta_2^2 = \delta_{D2}^2 + \delta_{P2}^2 + \delta_{H2}^2 \quad (II)$$

wherein $\delta_2$ is the total solubility parameter value of the plasticizer or mixture thereof, $\delta_{D2}$ is the solubility parameter value contributed by the dispersive forces of the plasticizer or mixture thereof, $\delta_{P2}$ is the solubility parameter value contributed by the polar forces of the plasticizer or mixture thereof, $\delta_{H2}$ is the solubility parameter value contributed by hydrogen bonding forces of the plasticizer or mixture thereof, wherein at least one pair of solubility parameter values $\delta_1-\delta_2$, $\delta_{D1}-\delta_{D2}$, $\delta_{P1}-\delta_{P2}$ and $\delta_{H1}-\delta_{H2}$ are within 15% of each other.

In a further aspect of the invention, the selected blends of the protein component and plasticizer component meeting the above criteria may optionally be subjected to a further screen wherein the free volume (FV) values of the selected blends are determined in accordance with the following Formula (Ill)

$$FV = 0.025 + \alpha_d(T-Tg_d) + \alpha_p(T-Tg_p) \qquad (III)$$

wherein $\alpha_d$ is the coefficient of thermal expansion of the plasticizer or mixture thereof, $\alpha_p$ is the coefficient of thermal expansion of the protein or mixture thereof, $Tg_d$ is the glass transition temperature of the plasticizer or mixture thereof, $Tg_p$ is the glass transition temperature of the protein or mixture thereof; and T is a reference temperature, typically ambient or the end use temperature.

Generally the higher the free volume of the blend, the more suitable the blend is for forming a plasticized proteinaceous material of the present invention.

In accordance with another aspect of the present invention, a glass transition temperature or range of temperatures for the plasticized proteinaceous material is selected and the relative amounts of the protein and plasticizer components are determined therefrom in accordance with the following Formula (IV)

$$T_{gmix} = \frac{\alpha_d}{\alpha_p} \cdot V_d(Tg_d - Tg_p) + Tg_p \qquad (IV)$$

wherein $\alpha_d$, $\alpha_p$, $Tg_d$, and $Tg_p$ are as defined above;

$T_{gmix}$ is the glass transition temperature of the plasticized proteinaceous material; and $V_d$ is the volume fraction of the plasticizer.

DETAILED DESCRIPTION OF THE INVENTION

In general, the present invention is directed to the formation of plasticized proteinaceous materials wherein a plasticizer or mixture thereof (plasticizer component) is dispersed within a matrix of at least one protein (protein component). Such materials possess properties which are particularly suited for a variety of uses, including but not limited, gums and confectionery compositions.

The successful formation of a plasticized proteinaceous material in accordance with the present invention depends first upon the proper selection of one or more blends comprising a protein or mixture thereof and a plasticizer or mixture thereof as determined by a variable referred to as the solubility parameter and optionally the free volume of the blend as described hereinafter.

The resulting blend of the protein component and the plasticizer component is then processed, preferably under heating and under controlled shear conditions, to provide a plasticized proteinaceous material which can replace one or more of the conventional ingredients in chewing gums and confectionery products as well as make such products edible and/or biodegradable. In particular, the plasticized proteinaceous material possesses the characteristics of a polymer (including tensile strength, deformability, elasticity and hardness).

In accordance with the present invention, the preferred process denatures the protein component in a melt state, i.e., a protein component in the form of a viscous liquid. More specifically the process comprises the heating under controlled shear conditions the blend of the protein component and the plasticizer component preferably in the solid state prior to processing, such that upon cooling, the plasticizer component becomes entrapped within a denatured matrix of the protein component.

Melting, or fusing, is a term generally used to describe the transformation of materials from the solid to liquid phase by the application of heat. Material that melts has flow and processibility. As is found with many of the synthetic polymers, proteins generally do not melt or flow upon heating. They usually decompose before the temperatures necessary to melt a protein can be reached. Plasticizers are substances which are usually added to polymeric materials to provide a blended material which will flow upon heating and thereby increase the workability or flexibility of the polymer. It has now been found that heating a blend of a plasticizer component with a protein component in the solid state to the melt state occurs without concomitant decomposition of the protein component and with concomitant denaturation of the protein component.

In accordance with the present invention, the matching of a suitable protein or mixture thereof and plasticizer or mixture thereof to form a blend for the formation of the plasticized proteinaceous material is important in achieving desirable properties of any product employing the same. It is the matching of the protein component and plasticizer component and the manner of obtaining the desired blend of these materials that provides a significant aspect of the present invention. It will be understood that a single protein or mixture of proteins may be combined with a single plasticizer or mixture of plasticizers to form a blend. For the sake of convenience only, reference hereinafter may be made to a blend formed from a single protein and a single plasticizer.

The selection of a suitable protein or mixture thereof will depend in part on the molecular weight of the protein and its processability within the range of temperatures desired for the formation of the end product (e.g. gums and confectionery compositions). Typical processing temperatures for forming chewing gums and confectionery compositions are within the range of from about 20° to 120° C. A suitable protein is also amenable to processing using conventional mixing equipment including extruders, blenders and the like.

The molecular weight of the protein must be sufficiently high so that the protein is classified as a polymer. Molecular weights of at least about 5,000, preferably at least about 10,000 are suitable.

The protein selected for the formation of the plasticized proteinaceous material must be matched with a suitable plasticizer. Heretofore the combining of proteins and plasticizers was random and only by trial and error often leading to blends which did not impart desirable properties to the end product. In accordance with one aspect of the present invention, the combining of protein and plasticizer is accomplished in part by matching the solubility parameters of the protein component and plasticizer component within a desired range and employing only those combinations which are closely related.

The matching of a suitable protein component with a plasticizer component therefore depends first on considering the solubility parameters of the protein component and the plasticizer component which are determined by their relative cohesive properties. The solubility parameter of various materials and methods of calculating the same is known in the art as disclosed, for example, in D. W. Van Krevelen Elsevier "Properties of Polymers" (1990), incorporated herein by reference.

The solubility parameter for a compound (e.g. a protein) is the sum of the solubility parameter values contributed by dispersive forces, hydrogen bonding forces and polar forces. In accordance with the present invention, a protein will dissolve in a plasticizer or be plasticized if either the total solubility parameter ($\delta$) or one or more of said disperse forces ($\delta_D$), polar forces ($\delta_P$), and hydrogen bonding forces ($\delta_H$) for each of the protein and plasticizer are similar. In particular, applicants have determined that if any one or more of the above solubility parameter values for a protein and plasticizer or respective mixtures thereof are within 15% of each, preferably 10%, the protein component and the plasticizer component may present a potential blend suitable for making the plasticized proteinaceous material.

More specifically in accordance with the present invention, the solubility parameter of a selected protein or mixture of proteins is determined in accordance with the following Formula I $$\delta_1^2 = \delta_{D1}^2 + \delta_{P1}^2 + \delta_{H1}^2 \quad (I)$$

wherein $\delta_1$ is the total solubility parameter value of the protein or mixture thereof;

$\delta_{D1}$ is the solubility parameter value contributed by the dispersive forces of the protein or mixture thereof;

$\delta_{P1}$ is the solubility parameter value contributed by the polar forces of the protein or mixture thereof; and $\delta_{H1}$ is the solubility parameter value contributed by hydrogen bonding forces of the protein or mixture thereof.

The solubility parameter of a proposed plasticizer or mixture of plasticizers suitable for forming a solid state blend is determined by the following Formula II $$\delta_2^2 = \delta_{D2}^2 + \delta_{P2}^2 + \delta_{H2}^2 \quad (II)$$

wherein $\delta_2$ is the total solubility parameter value of the plasticizer or mixture thereof;

$\delta_{D2}$ is the solubility parameter value contributed by the dispersive forces of the plasticizer or mixture thereof;

$\delta_{P2}$ is the solubility parameter value contributed by the polar forces of the plasticizer or mixture thereof; and $\delta_{H2}$ is the solubility parameter value contributed by hydrogen bonding forces of the plasticizer or mixture thereof.

In accordance with the present invention if at least one of the following pairs of solubility parameter values $\delta_1$–$\delta_2$, $\delta_{D1}$–$\delta_{D2}$, $\delta_{P1}$–$\delta_2$, and $\delta_{H1}$–$\delta_{H2}$ are within 15% of each other, preferably within 10% of each other, then the protein and plasticizer components present a blend that is a suitable candidate for forming a plasticized proteinaceous material in accordance with the present invention.

In a preferred form of the invention at least one of the pairs of solubility parameter values is within 10% of each other. It is also preferred that the blend of the protein component and the plasticizer component have similar $\delta$ values and/or $\delta_D$ values, especially when the selected protein includes zein and/or gliadin. Most preferred are protein-plasticizer blends having $\delta$ and $\delta_D$ values within 15%, most preferably 10% of each other.

The total solubility parameter values ($\delta$) and the component forces thereof ($\delta_D$, $\delta_P$ and $\delta_H$) for exemplary proteins and plasticizers are shown in Table 1.

TABLE 1

| Protein (P)/plasticizer | $\delta^*$ (J/cm$^3$)$^{0.5}$ | $\delta_D$ (J/cm$^3$)$^{0.5}$ | $\delta_P$ (J/cm$^3$)$^{0.5}$ | $\delta_H$ (J/cm$^3$)$^{0.5}$ |
|---|---|---|---|---|
| ZEIN (P) | 22.5 | 16.402 | 5.06 | 14.483 |
| GLIADIN (P) | 22.6 | 16.302 | 5.398 | 14.66 |
| Methanol | 29.2–29.7 | 15.2 | 12.3 | 22.3 |
| Ethanol | 26–26.5 | 15.8 | 8.8 | 19.5 |
| 1-Propanol | 24.4–24.5 | 15.9 | 6.8 | 17.4 |
| Isopropyl alcohol (2-Propanol) | 23.6 | 15.8 | 6.1 | 16.4 |
| Isobutyl alcohol | 22.9 | 15.2 | 5.7 | 16 |
| Phenol | 24.1 | 18 | 5.9 | 14.9 |
| Propylene Glycol (1,2-propanediol) | 30.3 | 16.9 | 9.4 | 23.3 |
| Butylene Glycol (1,3-butanediol) | 29 | 16.6 | 10 | 21.5 |
| Glycerol (1,2,3-propanetriol) | 33.8–43.2 | 17.3 | 12.1 | 29.3 |
| Formic acid | 25 | 14.3–15.3 | 11.9 | 16.6 |
| Acetic acid | 18.8–21.4 | 14.5–16.6 | 8 | 13.5 |
| Butyric acid | 18.8–23.1 | 14.9–16.3 | 4.1 | 10.6 |
| Water | 47.9–48.1 | 12.3–14.3 | 31.3 | 34.2 |

*$\delta^2 = \delta_D^2 + \delta_P^2 \delta_H^2$

As shown in Table 1, the proteins zein and gliadin have similar $\delta$ values (22.5 and 22.6), respectively. In addition, the $\delta_D$, $\delta_P$ and $\delta_H$ values are also similar. Plasticizers which exhibit similar solubility parameter values to zein and gliadin are isopropyl alcohol and isobutyl alcohol. Blends of zein and/or gliadin and isopropyl alcohol and/or isobutyl alcohol (i.e. having solubility parameter values within 15% of each other, preferably within 10%) would therefore be expected in accordance to the present invention to provide protein/plasticizer blends which are most suitable for the formation of plasticized proteinaceous materials of the present invention. Other candidates for the formation of blends of the present invention can be determined in a similar manner.

In an optional although preferred practice of the present invention suitable blends, after a list of candidate blends are screened by comparing the respective solubility parameter values, can be determined by considering the free volume of each candidate blend.

Free volume is the space between molecules. Free volume increases with increased molecular motion. Accordingly, a disproportionate amount of free volume is associated chain end groups in a polymer system.

Increasing the concentration of chain end groups, i.e. decreasing the molecular weight, therefore increases the free volume. The addition of flexible side chains into macromolecules therefore increases the free volume. All of these effects can be used for internal plasticization, and the free volume is spatially fixed with regard to the polymer molecule. However, the addition of a small molecule affects the free volume of large macromolecules at any location by the amount of the material added, which is known as external plasticization. The size and shape of the molecule that is added and the nature of its atoms and groups of atoms (i.e.

non-polar, polar, hydrogen bonding or not, and dense or light) determine how it functions as plasticizer.

The normal effect of increasing the free volume of a polymer is that it is plasticized (i.e. the glass transition temperature is lower, the modulus and tensile strength decreases, and the elongation and impact strength increases). However, the freedom of movement afforded by the plasticizer also permits the polymer molecules, if it is their nature to do so, to associate tightly with each other.

In general, free volume is based on the principle that a suitable plasticizer increases the free volume of the protein. An increase in the free volume of the protein increases the mobility of the protein and therefore the extent of plasticization. Thus, if more plasticization is desired, the amount of the plasticizer can be increased.

Thus, in addition to the selection of suitable protein and plasticizer candidates by comparing solubility parameter values, a further screen of such candidates is governed by the following Formula III.

$$FV = 0.025 + \alpha_d(T - Tg_d) + \alpha_p(T - Tg_p) \quad (III)$$

wherein

FV is the free volume of the blend;

$\alpha_p$ is the coefficient of thermal expansion of the protein;

$\alpha_d$ is the coefficient of the thermal expansion of the plasticizer;

T is the reference temperature; typically ambient temperature or end use temperature;

$Tg_d$ is the glass transition temperature of the plasticizer; and $Tg_p$ is the glass transition temperature of the protein.

Thus, the coefficient of thermal expansion of the protein component and the plasticizer component and their respective glass transition temperatures determine the free volume and therefore the degree of plasticization of the blend. For most cases in the chewing gum and confectionery art, for a given protein and mixture thereof, the higher the free volume of the blend, the more suitable the plasticizer. Thus, for a given protein component the most effective plasticizer component will be the one that provides the blend with the largest free volume value.

The free volume of blends comprising the protein zein and various plasticizers is shown in Table 2.

TABLE 2

| Protein (P)/ Plasticizer | Coeff. Thermal Expansion $10^3$ [K$^{-1}$] | Glass Transition Temperature Tg (°C.) | Free Volume of Blend With Zein (CC) |
|---|---|---|---|
| ZEIN (P) | 0.290 | 82 | — |
| GLYCERIN | 0.281 | 18 | 0.0105 |
| PROPYLENE GLYCOL | 0.277 | −60 | 0.0320 |
| POLYETHYLENE GLYCOL | 0.313 | −12 | 0.0201 |
| ETHANOL | 0.275 | −116 | 0.0473 |

As shown in Table 2, the combination of ethanol and zein provides the highest free volume value of the potential candidates shown therein. Generally, the higher the free volume, the better the degree of plasticization of the materials constituting the blend. Accordingly, the free volume can be employed as a tool in selecting a desirable plasticizer component for a preselected protein or mixture thereof.

Once a potential blend of a protein component and a plasticizer component has been identified by comparing the respective solubility parameter values of the protein component and the plasticizer component alone or optionally the free volume of the blend as discussed above, the glass transition temperature of the end product (plasticized proteinaceous material) must be considered. For example, for chewing gums and confectionery compositions a suitable glass transition temperature for the plasticized proteinaceous material is in the range of, for example, from about 35° to 45° C.

The determination of a glass transition temperature for the plasticized proteinaceous material ($T_{gmix}$) is made in accordance with the following Formula (IV)

$$T_{gmix} = \frac{\alpha_d}{\alpha_p} \cdot V_d(Tg_d - Tg_p) + Tg_p \quad (IV)$$

wherein $\alpha_d$, $\alpha_p$, $Tg_d$, and $Tg_p$ are as previously defined; and $V_d$ is the volume fraction of the plasticizer.

The glass transition temperature of the plasticized proteinaceous material therefore is determined by the ratio of the respective coefficients of thermal expansion, the volume fraction of the plasticizer component and the difference between the respective glass transition temperatures of the plasticizer component and the protein component. Generally, the glass transition temperature of the plasticized proteinaceous material can be increased by selecting a plasticizer component having a relatively high coefficient of thermal expansion and/or a higher glass transition temperature. If a lower glass transition temperature of the plasticized proteinaceous material is desired, it is appropriate to select a protein having a relatively high coefficient of thermal expansion and/or a lower glass transition temperature.

The effect of a change in the volume fraction of the plasticizer on the glass transition temperature of the plasticized proteinaceous materials for a given blend of protein and plasticizer is shown in Tables 3 and 4 wherein zein is combined with ethylene glycol and ethanol in varying amounts.

TABLE 3

| ZEIN Volume Fraction | ETHYLENE GLYCOL Volume Fraction | Tg (ppm)* Deg C. |
|---|---|---|
| 0.9 | 0.1 | 39.7 |
| 0.8 | 0.2 | 33.5 |
| 0.7 | 0.3 | 27.2 |
| 0.6 | 0.4 | 20.9 |
| 0.5 | 0.5 | 14.6 |
| 0.4 | 0.6 | 8.4 |
| 0.3 | 0.7 | 2.1 |
| 0.2 | 0.8 | −4.2 |
| 0.1 | 0.9 | −10.5 |

*plasticized proteinaceous material

TABLE 4

| ZEIN Volume Fraction | ETHANOL Volume Fraction | Tg (ppm)* Deg C. |
|---|---|---|
| 0.9 | 0.1 | 30.6 |
| 0.8 | 0.2 | 15.2 |
| 0.7 | 0.3 | −0.2 |
| 0.6 | 0.4 | −15.5 |
| 0.5 | 0.5 | −30.9 |
| 0.4 | 0.6 | −46.3 |
| 0.3 | 0.7 | −61.7 |
| 0.2 | 0.8 | −77.1 |
| 0.1 | 0.9 | −92.5 |

*plasticized proteinaceous material

As shown in Tables 3 and 4, as the amount of the plasticizer increases and the volume of the protein decreases, the glass transition temperature of the blend decreases. Thus, the glass transition temperature of the plasticized proteinaceous material can be modified by altering the relative amounts of the protein and plasticizer in accordance with Formula (IV).

The proteins suitable for use in the present invention may be any synthetic or natural protein such as any plant or animal protein and may be water soluble or water insoluble. The protein may be enzymatically modified, chemically modified or the product of genetic engineering technology. The protein may be substantially pure or may be a part of a mixture such as in a grain fraction. It will be understood that when grain fractions are employed, the glass transition temperature of one batch may differ from another and this may affect the solubility parameter values and/or the glass transition temperature thereof.

The protein may be selected from but not limited to:
grain proteins such as corn, wheat, barley, rice, oat, soya and sorghum proteins and their fractions including gluten and prolamines such as zein, glutenin and gliadin; and
animal proteins such as collagen, egg and milk proteins including gelatin, egg albumin (ovalbumin), lactalbumin, casein and sodium caseinate, whey, and milk isolates such as blends of caseinate and whey.

The selection of the protein or mixture thereof for use in preparing a plasticized proteinaceous material of the present invention is based on several factors including the properties sought for the plasticized protein product. For a chewable confection such as a nougat or a chewable medicament in which it is desirable to provide water solubility, it is preferred to use a protein component which can provide a water soluble product. For a conventional chewing gum, it is desirable to use a protein component which provides a water insoluble product. Other factors include the desired viscoelastic properties of the product. For example, a product having a more viscoelastic character is generally provided by use of a protein component selected from the wheat and corn protein groupings including corn zein and wheat gliadin, or gelatin, and their blends. By contrast a product having less viscoelastic character is generally provided by use of a protein component selected from egg white, whey and sodium caseinate.

As previously indicated, the selection of a protein or mixture thereof is dependent in part on its glass transition temperature. For many applications proteins or mixtures thereof, having a glass transition temperature of from about 40° to 120° C. for processing at temperatures in the range of from about 20° to 120° C., are preferred. It will be understood that many commercially available proteins have a significant residual water content. Water tends to lower the glass transition temperature of proteins. Thus, the presence of water in a protein must be taken into account when selecting a protein component for the making of a plasticized proteinaceous material in accordance with the present invention.

A single protein or combination of proteins may be used as the protein component for forming a blend. Protein combinations include, but are not limited to, zein/egg white, zein/sodium caseinate, zein/milk isolate, egg white/milk isolates, gluten/gelatin, gelatin/zein, gelatin/sodium caseinate, gelatin/gliadin, gelatin/milk isolate and the like. Combinations which combine different characters are preferred for some uses such as a combination which combines a more rubbery-like protein such as gelatin, with a more plastic-like protein, such as gliadin.

The plasticizer, as discussed previously herein, is a material which provides both workability to the plasticized proteinaceous material and contributes to its viscoelastic character. The plasticizer or mixture thereof suitable for use in the present invention may be selected from a variety of materials including organic plasticizers and those like water which do not contain organic compounds.

Organic plasticizers which are the preferred class of plasticizers include, but are not limited to, phthalate derivatives such as dimethyl, diethyl and dibutyl phthalate; polyethylene glycols with molecular weights preferably from about 200 to 6,000; glycerol; glycols such as polypropylene, propylene, polyethylene and ethylene glycol; citric esters such as tributyl, triethyl and triacetyl citrates; surfactants such as sodium dodecyl sulfate, polyoxymethylene (20) sorbitan and polyoxyethylene (20) sorbitan monooleate, blended with water; alcohols such as ethanol and isopropyl alcohol; organic acids such as acetic and lactic acids and their lower alkyl esters; bulk sweeteners such as sorbitol, mannitol, xylitol and lycasin; fats/oils such as vegetable oil, seed oil and castor oil; acetylated monoglyceride; triacetin; sucrose esters; traditional flavor oils; or mixtures thereof. Preferred organic plasticizers are the polyols such as glycerol and the glycols, especially propylene glycol, polypropylene glycol, ethylene glycol and polyethylene glycol, and organic acids especially lactic and acetic acid, and their corresponding esters.

The amount of the protein component present in the protein/plasticizer blend will vary as discussed above. Consideration must be given to the desired glass transition temperature of the plasticized proteinaceous material. Typically the amount of protein component will be at least 40% by weight and most typically at least 50% by weight. Especially good plasticized proteinaceous materials are generally obtained when the amount of the protein component is from about 60 to 75% by weight.

Preferred amounts of typical plasticizers based on the total weight of the protein/plasticizer blend include, for example, aqueous ethanol (20–40% by weight), propylene glycol (20–40% by weight) ethylene glycol (10–30% by weight), and acetic acid and lactic acid (10–30% by weight). It will be understood that for applications involving food products (e.g. chewing gum and confectionery compositions) ethanol may not be preferred because of regulatory requirements governing its use.

Preferred blends of proteins and plasticizers for chewing gums and confectionery products include zein/propylene glycol/glycerol; zein/glycerol/propylene glycol/acetic acid/water; zein/lactic acid/glycerol/propylene glycol/glycol; and zein/lactic acid/propylene glycol/ethyl lactate/butyl lactate/ethyl acetate/glycerol.

The protein component and the plasticizer component are each used in the dry state, i.e., a pre-blend of protein and plasticizer would have the physical properties of a powder with the plasticizer dispersed uniformly with the protein. The protein/plasticizer blend will usually be comprised of a blend of proteins, and/or a blend or plasticizers to take advantage of the property of each component so as to maximize the compatibility of the components of the blend.

The protein and plasticizer are combined into a blend and the blend is treated to form a mixture with the plasticizer dispersed within a matrix of the protein. In a preferred form of the invention, the mixture of the protein and the plasticizer comprises a highly viscous material at the melt stage of the protein (i.e. a plasticized proteinaceous material). Both the melt temperature and the viscosity of the blend at the melt temperature can be affected by the type and the amount of plasticizer present. In general, the greater the amount of plasticizer used in the practice of the present invention to form the plasticized proteinaceous material, the lower the melt temperature and the lower the viscosity of the blend used to form the plasticized proteinaceous material.

Other materials may be blended with the protein component prior to the melt-plasticization. For example, in chewing gum, while varying amounts of the protein component and the plasticizer component can be used to provide materials which can replace conventional elastomers and PVAc in gum and also provide waxy and other characteristics, the incorporation of other materials into the melt plasticization process can also be used for these additional characteristics. For example, an embodiment of the present invention combines a polysaccharide with the protein component prior to the melt-plasticization. While the polysaccharide has minimal effect on the viscoelastic properties of the plasticized proteinaceous material, it can provide properties usually provided by components such as wax found in conventional chewing gum.

The polysaccharides suitable for use in the present invention may be neutral or ionic. Ionic polysaccharides include pectin, carrageenan, propylene glycol alginate and the like. The neutral polysaccharides include cellulose esters and ethers.

The process may optionally be carried out in the presence of an acid. Acid affects the isoelectric point of the protein component which is predominantly a dipolar ion at neutral pH. Changing pH enhances the interaction of the protein component as well as the protein/polysaccharide mixture. Both organic and inorganic acids may be used to provide an acidic pH.

The formation of a plasticized proteinaceous material from a blend of a protein component and a plasticizer component is preferably carried out at temperatures of from about 20° to 120° C. under controlled shear conditions. "Controlled shear conditions" in accordance with the present invention shall mean that the blend is exposed to shear to an extent sufficient to uniformly disperse the plasticizer within the matrix of the protein.

Shear and its determination and effect on various materials is disclosed in Ronald Darby, "Viscoelastic Fluids" (Marcel Deker, Inc. 1976) pp. 7 and 8, incorporated herein by reference.

For purposes of the present invention, the blend of the protein component and the plasticizer component are subjected to shear conditions that are more severe than customarily employed for the preparation of chewing gums and confectionery compositions. More specifically, gums and confectionery compositions are typically prepared in an open kettle using sigma mixing blades (i.e. blades that have an S-shape). Shear is maintained at modest levels a) because the kettle is open and therefore the blend can rise within the kettle during blending so as to relieve stress and b) because the S-shaped sigma blades provide only modest shear rates to the blend.

In accordance with the present invention, the shear applied to the blend of protein and plasticizer is greater than customarily employed in the preparation of gums and confectionery compositions. Such equipment can be, for example, a mixer or extruder using roller blades and similar devices.

The plasticization of the blend of protein and plasticizer may be carried out in a mixer or in an extruder. In either instance, the apparatus should be one that provides a medium or preferably a high shear. A higher shear is preferred to uniformly disperse the plasticizer component within the matrix of the protein component. Low shear mixers such as those utilizing sigma blades as previously indicated, which are traditionally used in gum base and chewing gum manufacture to provide tumbling and kneading without imposing a strong compressive force, generally do not provide sufficient shear to denature the protein. Cam blades are known to provide medium shear and are useful for studying the properties of rubber and elastomeric materials. Roller blade mixers, however, are more suitable for use in preparing the plasticized proteinaceous material because they provide a higher shear due to their curve-angular design. Suitable mixers of this type for use in the present invention include, but are not limited to, Brabender, Hobart, Sigma Kettle, Hakke and Planetary mixers.

The formation of a plasticized proteinaceous material from a blend of a protein component and a plasticizer component is carried out at elevated temperatures under high shear conditions. In a mixer, such as a Brabender mixer, the blend of protein and plasticizer is heated at a temperature of from about 20° C. (ambient) to about 140° C., preferably from about 20° to 120° C. and processed under high shear until the torque becomes constant indicating substantial denaturing has been completed. The time will be dependent upon such factors as the type and the amounts of protein and plasticizer. Higher temperatures, up to 140° C., can be used to shorten the process time but higher temperatures can in some cases adversely affect the protein. Generally less time is required if more plasticizer is present. The mixer may be stopped at this point, the material removed while hot, then cooled, analyzed and used.

A mixer is particularly suitable for processing a protein or a mixture of proteins in the presence of plasticizer to develop higher processing torque values. For economical reasons such as shorter processing times and the potential for continuous processing, the process is preferably carried out in an extruder. Suitable extruders should provide a shear capable of uniformly dispersing the protein in the matrix of plasticizer (i.e. high shear). Suitable extruders include, but are not limited to, Berstoff, Killion, Brabender and Werner-Pfleiderrer extruders.

The extruder is particularly suitable for processing proteins or mixtures of protein which do not aggregate excessively and therefore maintain a lower constant processing torque value. Preferably, the protein component is first vigorously mixed with the plasticizer component then melt extruded. The extrudates may be collected in strand or in film form and analyzed.

With either a mixer or extruder the process is preferably carried through to the denaturation stage of the protein just prior to any excessive aggregation of the protein. Aggregation, or networking, of the denatured protein occurs through the formation of intermolecular bonds. When proteins denature the functional groups that were engaged in intramolecular hydrogen bonding and hydrophobic interactions in the native state become available for intermolecular interactions. This results in aggregation to progressively form a visoelastic network. The material goes from a powder to a paste.

Materials which have a long processing window of time during the denaturing stage prior to aggregation or which do not aggregate to any extent are preferred for use in making plasticized proteinaceous materials. It has been found that materials which exhibit viscoelastic properties herein can be provided by materials which do not aggregate to any great extent after denaturing. The processing of these materials is more easily controlled. Where it is desirable to use the material in a process which makes chewing gum or confectionery compositions in one step, the material is more amenable for such use. Zein, gliadin, milk isolates and gelatin, per se, can be readily melt processed, as illustrated further herein, and are particularly suitable as precursors for gum ingredients. For those materials that do excessively aggregate it is preferable to halt the melt-plasticization process just prior to the excessive aggregation. Proteins such as egg white, whey and sodium caseinate are more likely to aggregate upon denaturing and have higher processing viscosities with more limited process times as illustrated further herein. These materials can be used as blends with proteins which are prone to less aggregation to provide a desirable plasticized proteinaceous material.

The amount of the plasticizer component present can also have an affect on the processing window of time. In general the greater the amount of plasticizer present in the blend, the longer the processing window of time although the benefit of adding additional plasticizer will level off. With proteins such as zein and related prolamines it is preferred to have a protein/plasticizer blend of from about 90 to 75% protein and from about 10 to 25% plasticizer by weight. For proteins such as egg white it is preferred to have from about 75 to 50% protein and from about 25 to 50% plasticizer in the blend.

The plasticized proteinaceous material may be isolated after the plasticization process or the process may be continued to prepare an end product such as a chewing gum. Where the material is isolated, it may be used in traditional batch making processes. These processes are well known to those skilled in the art. The chewing gum may also be prepared using an extruder.

A one step process, i.e., a process which prepares a chewing gum directly, is a preferred embodiment. Either a mixer or an extruder may be used for this process, although the use of an extruder is preferred. The extruder allows for the manufacture of the chewing gum in a continuous process, i.e., the chewing gum ingredients are continuously added while the product is removed through an exit port. The protein component and the plasticizer component may be added to the initial barrels of the extruder or the plasticizer may be added to a second or third barrel and the blend heated under controlled shear conditions as previously described. Resin and other gum base ingredients may also be added at this time or at a later stage. Traditional chewing gum components such as sweetener and flavor may then be added at a later stage. Higher temperatures can be used initially with lower temperatures employed for the incorporation of flavor and sweetener. Alternatively, a plasticized proteinaceous material may be prepared in an extruder, and the resulting material added to the initial barrels.

The extruder can be used to prepare a chewing gum comprised of rapidly aggregating and slower aggregating proteins. Processing times can be controlled by selection of the order of addition. The proteins which do not rapidly aggregate and have low torque values can be added to the extruder at the beginning of the process. The proteins that rapidly aggregate may be used as short processing time additives.

The plasticized proteinaceous material of the present invention can be used as a substitute for one or more conventional materials in gums and confectionery compositions, including waxes, elastomers and rosins. This substitution makes it possible to produce products which are edible and/or biodegradable. However, it will be understood that conventional ingredients may be included in such compositions.

Conventional elastomers used in chewing gum bases may be any water insoluble polymer known in the art. They include styrene-butadiene copolymers (SBR) and non-SBR types. Examples of natural elastomers include, without limitation, rubbers such as rubber latex (natural rubber) and guayule, and gums such as chicle, jelutong, balata, guttapercha, lechi capsi, sorva, crown gum, nispero, rosidinha, perillo, niger gutta, tunu, gutta kay, pendare, leche de vaca, chiquibul, crown gum, and the like, and mixtures thereof. Examples of synthetic elastomers include, without limitation, polyisobutylene, isobutylene-isoprene copolymers, (butyl rubber), polyethylene, polybutadiene, styrene-butadiene copolymers, polyisoprene and the like, and mixtures thereof. The amounts of elastomer (rubbers) employed in a traditional gum base composition will vary greatly depending upon various factors such as the type of gum base used (abhesive, non-adhesive or conventional, bubble gum or standard) the consistency of the gum base composition desired, and the other components used in the composition to make the final product. For example, elastomer is usually present in a gum base composition in an amount of from about 2% to about 60% by weight based on the total weight of the gum base composition.

Polyvinyl acetates (PVAc) are usually added to a gum base in amounts dependent upon their molecular weight range. The total amount of PVAc used in a gum base composition is usually from about 5% to 95% by weight based on the total gum base composition.

The present invention also concerns the incorporation of traditional chewing gum components such as elastomer solvents (tackifiers), waxes, fats/oils, emulsifiers, surfactants, fillers, antioxidants and the like into the gums of the present invention.

Elastomer solvents (tackifiers) include, but are not limited to, natural rosin esters and synthetic derivatives of, e.g., terpenes. Examples of elastomer solvents suitable for use herein include tall oil rosin ester; partially hydrogenated wood and gum rosin; the glycerol esters of wood and gum rosin, partially hydrogenated wood/gum rosin, partially dimerized wood and gum rosin, polymerized wood and gum rosin, and tall oil rosin; the deodorized glycerol ester wood rosin; the pentaerythritol esters of wood and gum rosin; partially hydrogenated wood and gum rosin; the methyl ester of partially hydrogenated wood rosin; methyl, glycerol and pentaerythritol esters of rosins and modified rosins such as hydrogenated dimerized and polymerized rosins; terpene resins such as polymers of alpha-pinene or beta-pinene, terpene hydrocarbon resins; polyterpenes; and the like, and mixtures thereof. The elastomer solvent may be employed in the gum base composition in an amount of from about 2% to about 75% by weight of the gum base composition.

Waxes may be of mineral, animal, vegetable or synthetic origin. Non-limiting examples of mineral waxes include petroleum waxes such as paraffin and microcrystalline waxes, animal waxes include beeswax, vegetable waxes include carnauba, candelilla, rice bran, esparto, flax and sugarcane, and synthetic waxes include those produced by the Fischer-Tropsch synthesis, and mixtures thereof. Suitable oils and fats usable in gum compositions include hydrogenated or partially hydrogenated vegetable or animal fats, such as cottonseed oil, soybean oil, coconut oil, palm kernel oil, beef tallow, hydrogenated tallow, lard, cocoa butter, lanolin and the like; fatty acids such as palmitic, oleic, stearic, linoleic, lauric, myristic, caproic, caprylic, decanoic or esters and salts as sodium stearate and potassium stearate. These ingredients when used are generally present in amounts up to 14% by weight of the gum composition.

Typical emulsifiers include acetylated monoglyceride, glyceryl monostearate, fatty acid monoglycerides, diglycerides, propylene glycol monostearate, lecithin, triacetin, glyceryl triacetate and the like, and mixtures thereof. Preferred emulsifiers are glyceryl monostearate and acetylated monoglycerides. These also serve as plasticizing agents. The emulsifier may be employed in an amount of from about 1% to about 15% weight of the gum base composition.

The gum base may further contain a surfactant. Examples of suitable surfactants include polyoxymethylene (20) sorbitan monoleate, polyoxyethylene (20) sorbitan monolaurate, polyethylene (4) sorbitan monolaurate, polyoxyethylene (20) sorbitan monopalmitate, polyoxyethylene (20) sorbitan monostearate, polyoxyethylene (4) sorbitan monostearate, polyoxyethylene (20) sorbitan tristearate, polyoxyethylene (5) sorbitan monooleate, polyoxyethylene (20) sorbitan trioleate, sorbitan monolaurate, and the like. The amount of surfactant present should be effective to provide the finished chewing gum with the desired softness. Typically, the surfactant is employed in the base in an amount of from about 0.5% to about 3.0% by weight based on the total weight of the gum base.

The gum base composition may also include effective amounts of fillers. Useful fillers include organic and inorganic compounds such as calcium carbonate, magnesium carbonate, ground limestone, magnesium silicate, calcium phosphate, cellulose polymers, clay, alumina, aluminum hydroxide, aluminum silicate, talc, tricalcium phosphate, dicalcium phosphate, and the like, and mixtures thereof. Typically, the filler is employed in the gum base composition in an amount from about 1% to about 40% by weight of the gum base composition.

The gum base may also comprise an antioxidant. Typical non-limiting examples of antioxidants are butylated hydroxytoluene (BHT), butylated hydroxyanisole (BHA), and propyl gallate. Mixtures thereof may also be used.

Other conventional chewing gum additives known to one having ordinary skill in the chewing gum art may also be used in the gum base composition of the present invention.

The amount of gum base employed in a traditional chewing gum composition will vary. In general, base can be included in the final chewing gum product in amounts of from about 10 to 75% by weight of the product.

A chewing gum composition will also contain bulk sweeteners. Suitable sugars include monosaccharides, disaccharides and polysaccharides such as xylose, ribulose, glucose (dextrose), mannose, galactose, fructose (levulose) sucrose (sugar), maltose, invert sugar, partially hydrolyzed starch and corn syrup solids, and mixtures thereof. Suitable non-sugar bulking agents include sugar alcohol bulking agents such as sorbitol, xylitiol, mannitol, galactitol, maltitol, and mixtures thereof, isomalt, maltodextrins; hydrogenated starch hydrolysates; hydrogenated hexoses; hydrogenated disaccharides; and the like, and mixtures thereof. Bulking agents or sweeteners described above, may be used in an amount of from about 17% to about 90%, by weight based on the total weight of the gum base composition.

The chewing gum compositions may also include a high intensity sweetening agent (sweeteners). Examples of suitable intense sweeteners include (A) water-soluble naturally-occurring intense sweeteners such as dihydrochalcones, monellin, steviosides, glycyrrhizin, dihydroflavenol, and L-aminodicarboxylic acid aminoalkanoic acid ester amides, such as those disclosed in U.S. Pat. No. 4,619,834, and mixtures thereof; (B) water-soluble artificial sweeteners including the soluble saccharin salts such as sodium or calcium saccharin salts, cyclamate salts, the sodium, ammonium or calcium salts of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfam-K), the free acid form of saccharin, and the like, and mixtures thereof; (C) dipeptide based sweeteners including L-aspartic acid derived sweeteners, such as 1-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenyl-glycerine and L-aspartyl-L-2,5-dihydrophenyl-glycine, L-aspartyl-2,5-dihydro-L-phenylalanine, L-aspartyl-L-(1-cyclohexene)-alanine, and the like, and mixtures thereof; (D) water-soluble intense sweeteners derived from naturally-occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose®; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1', 6'-dichloro-1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxy-sucrose, and mixtures thereof; and (E) protein based intense sweeteners such as thaumaoccous danielli (Thaumatin I and II). The intense sweeteners are usually used in an amount of up to about 1% by weight based on the total weight of the chewing gum composition.

The chewing gum composition may also contain a flavoring agent selected from those flavors known to the skilled artisan, and include natural and artificial flavors. Non-limiting representative flavor agents include (A) flavor oils such as spearmint, cinnamon, oil of wintergreen (methyl salicylate), peppermint (menthol), clove, bay, anise, eucalyptus, thyme, cedar leaf, oil of nutmeg, allspice, oil of sage, mace, oil of bitter almonds, and cassia oil; (B) artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth; (C) aldehydes and esters such as acetaldehyde, benzaldehyde, anisic aldehyde, cinnamic aldehyde, citral, neral, decanal, ethyl vanillin, heliotrope, piperonal, vanillin, alpha-amyl cinnamaldehyde, butyraldehyde, valeraldehyde, citronellal, decanal, dihydrocarvyl acetate, eugenyl formate, aldehyde C-8, aldehyde C-9, aldehyde C-12, 2-ethyl butyraldehyde, hexenal, tolyl aldehyde, veratraldehyde, 2,6-dimethyl-5-heptenal, 2,6-dimethyloctanal, 2-dodecenal, p-methylanisol, and so forth. Generally any flavoring or food additive such as those described in Chemicals Used in Food Processing, publication 1274, pages 63–258, by the National Academy of Sciences, incorporated herein by reference, may be used. Other ingredients which may be used in the flavor component include acids such as citric, tartaric, malic and the like acidulants. In gum compositions, the flavoring agent is generally present in amounts from about 0.02% to 5% by weight of the chewing gum composition.

The chewing gum composition may also contain a coloring agent selected from but not limited to pigments such as titanium dioxide, which may be incorporated in amounts up to about 6%, by weight of the gum composition, natural food colors and dyes suitable for food, drug and cosmetic applications, known as F.D.&C. dyes and lakes. A recitation of all F.D.&C. colorants and their corresponding chemical structures may be found in the Kirk-Othmer Encyclopedia of Chemical Technology, $3^{rd}$ Edition, in Volume 5 at page 857–884, incorporated herein by reference.

Other conventional additives may be used in chewing gum compositions. Example of other conventional additives which may be used include thickening agents such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

The present invention can be employed to produce confectionery products such as nougats. Nougats are a combination of whipped candy and soft candy. Proteins such as egg whites or egg albumen are employed in which much of the moisture is removed while the egg whites are mixed with the other ingredients including honey, sugar, nuts such as pistachio and/or almonds and flavorings. The plasticized proteinaceous material of the present invention may be employed as a substitute for the protein and/or conventional ingredients contained therein or as an additive therein.

There are two types of nougat: chewy nougat and short nougat. Either type can be made by using egg albumen, egg frappè or other protein-based materials.

The shortness or the chewiness of the batch of nougat is controlled by the percentage of non-crystalline sugars, such as corn syrup, invert sugar or honey that the batch contains, and the mixing method employed in manufacture. The high-cooked portion of short nougat usually contains a larger percentage of sugar than does the whipped portion of the batch. The high-cooked portion of the batch should be added slowly, to the whipped egg frappè, so that the heat of the high-cooked batch will not cook the egg whites. The low-cooked batch, to which the egg whites are to be added, should be cooled sufficiently that the heat of the batch will not cook the egg whites and thus destroy their whipping quality.

Chewy nougat should contain more corn syrup than short nougat. The high-cooked batch should contain less sugar than short nougat. A batch of nougat that contains equal parts sugar and corn syrup of honey can become either a chewy nougat or a short nougat by varying amount of sugar and corn syrup or honey used in the high-cooked and low cooked batches.

The preparation of nougats is disclosed in "*Choice Confections*", Waller Richmond (Chapter 14), pp 251–267, Manufacturing Confectionery Publishing Company (1954), incorporated herein by reference.

In accordance with the present invention the plasticized proteinaceous material can be employed in nougat products to provide desirable characteristics. While chewing gums employ proteins which are insoluble, nougats and other chewable confections typically are made in accordance with the present invention with soluble proteins.

The production of gums using the plasticized proteinaceous materials of the present invention require that the starting protein or mixture thereof be water insoluble. The term "water insoluble" shall be used in its customary broad sense and shall mean that the vast majority of the material in question does not dissolve in water under typical processing conditions. Examples of water insoluble proteins are zein, gluten, and lactalbumin.

Proteins which are typically water soluble and therefore can not be used in chewing gums can be rendered water insoluble. Such proteins can be treated with a cross-linking agent to create a cross-linked protein which is incompatible with water. Such cross-linking agents must be of the food grade variety and include tannic acid, poly-phenols, glutamic acid, L-lysine monohydro chloride, glutaric dialdehyde, D-glucose and gluteraldehyde.

While the present invention has been described with respect to what is presently considered to be the preferred embodiments, it is to be understood that other embodiments are within the purview of the invention as encompassed by the claims forming part of the Application.

EXAMPLE 1

Matching of Protein and Plasticizer

The following shows an exemplary procedure for identifying a plasticizer suitable for forming a blend with a preselected protein (i.e. zein)

The solubility parameter for zein is determined by identifying or calculating its total solubility parameter value $\delta$ and the components thereof $\delta_D$, $\delta_P$ and $\delta_H$. The respective solubility parameter values are shown in Table 5 below.

TABLE 5

| Protein (P)/plasticizer | $\delta^*$ $(J/cm^3)^{0.5}$ | $\delta_D$ $(J/cm^3)^{0.5}$ | $\delta_P$ $(J/cm^3)^{0.5}$ | $\delta_H$ $(J/cm^3)^{0.5}$ |
|---|---|---|---|---|
| ZEIN (P) | 22.5 | 16.402 | 5.06 | 14.483 |
| Ethanol | 26–26.5 | 15.8 | 8.8 | 19.5 |
| Propylene Glycol (1,2-propanediol) | 30.3 | 16.9 | 9.4 | 23.3 |

$\delta^2 = \delta_D^2 + \delta_P^2 + \delta_H^2$

The solubility parameters of a group of plasticizers is then obtained or calculated. For purposes of illustration only ethanol and propylene glycol were chosen as the potential plasticizers for forming a blend with zein. It will be understood, however, that solubility parameters for a much larger group of plasticizers may be obtained or calculated as shown, for example, in Table 1. The solubility parameter values of ethanol and propylene glycol are shown in Table 5.

The solubility parameter values for $\delta$, $\delta_D$, $\delta_P$ and $\delta_H$ for the protein and plasticizers are then compared. If the solubility parameter value for the protein is within 15%, preferably 10% of the corresponding solubility parameter value of the plasticizer then the pair are considered favorable candidates for forming a blend. For the protein and plasticizers listed in Table 5, their respective suitability for forming blends with each other is shown in Table 6.

TABLE 6

| Protein (P)/plasticizer | $\delta^*$ $(J/cm^3)^{0.5}$ | $\delta_D$ $(J/cm^3)^{0.5}$ | $\delta_P$ $(J/cm^3)^{0.5}$ | $\delta_H$ $(J/cm^3)^{0.5}$ |
|---|---|---|---|---|
| ZEIN (P) | 22.5 | 16.402 | 5.06 | 14.483 |
| Ethanol | − | ++ | − | − |
| Propylene Glycol (1,2-propanediol) | − | ++ | − | − |

− difference in solubility parameter value > 15%
+ difference in solubility parameter value ≦ 15%
+ + difference in solubility parameter value ≦ 10%

From Table 6 it is observed that both ethanol and propylene glycol are potential candidates for forming a blend with zein because each has at least one solubility parameter value (i.e. $\delta_D$) within 15%, preferably within 10% of the protein.

To determine the best of the two plasticizers for forming a blend with zein, the free volume of each protein-plasticizer blend is calculated in accordance with Formula III as described previously. The results are shown in Table 7.

TABLE 7

| Protein/<br>Plasticizer | Coeff Thermal<br>Expansion<br>$10^3$ [$K^{-1}$] | Glass Transition<br>Temperature<br>Tg (Deg C) | Free Volume<br>ZEIN BLENDS<br>cc* |
|---|---|---|---|
| ZEIN | 0.290 | 62 | — |
| PROPYLENE<br>GLYCOL | 0.277 | −60 | 0.0320 |
| ETHANOL | 0.275 | −116 | 0.0473 | at a reference temperature T of 25° C.

As shown in Table 7, the blend of zein and ethanol has a larger free volume than the blend of zein and propylene glycol. As to these two specific blends, the blend of zein and ethanol would be expected to be preferred for processing as compared to the blend of zein and propylene glycol for the formation of a plasticized proteinaceous material because of its larger free volume value.

Once the potential blend or blends have been determined as described above, the glass transition temperature of the expected end product (plasticized proteinaceous material) is determined based on a selected volume fraction of the plasticizer in accordance with Formula (IV) described above. The glass transition temperatures of zein and ethanol are shown in Table 8.

TABLE 8

| Protein/Plasticizer | Glass Transition<br>Temperature Tg (° C.) |
|---|---|
| Zein | 82 |
| Ethanol | −116 |

From this information and the knowledge of a desirable range for the glass transition temperature of the end product, a suitable amount of zein and ethanol can be employed for forming the blend which can then be processed under heating and controlled shear conditions to obtain a plasticized proteinaceous material in accordance with the present invention.

EXAMPLE 2

Forming Plasticized Proteinaceous Material

I. Batch Mixing

This example illustrates that a selection of proteins and plasticizers or mixtures of plasticizers can be successfully treated under the conditions of the present invention to provide a plasticized proteinaceous material. This example further illustrates the use of a high shear batch-type mixing apparatus.

Zein, milk isolates and gelatin are shown to be easily melt processed. Egg white, whey and sodium caseinate are also shown to melt process but with excessive aggregation. The latter display increased torque values and limited processability beyond a certain time and temperature over the former. All of the plasticized proteinaceous materials formed in accordance with the present invention exhibit properties which can be used to replace the synthetic ingredients in chewable confections.

The denaturation of the proteins is indicated by a peak in the processing torque values (fusion torque values) due to the phase transition from the powder to a viscous paste. Measurements of the torque values (a measurement of viscosity), glass transition temperatures and the mechanical properties of plasticized proteinaceous materials are provided.

The zein, egg white, milk (whey concentrate, sodium caseinate, milk isolates (blend of 80% caseinate and 20% whey)), and gelatin (GP-8, 250 Bloom) were obtained from Freeman Industries, Clofine Dairy and Food Products, New Zealand Milk Products and Hormel Foods Corporation, respectively. These commercial proteins were used as received.

The propylene glycol and glycerol were from Sigma and the triethyl citrate, polyethylene glycol and sorbitol were from Morflex, Aldrich and SPI Polyols respectively.

The butyl rubber was poly (isobutylene-isoprene) copolymer (Butyl 077, Mol. Wgt.=400,000) from Exxon; the poly(vinyl acetate) was AYAC, Mol Wgt.=12,800, from Union Carbide; the Wax 175 was from Petrolite.

In these examples the proteins were plasticized using a C. W. Brabender Torque Rheometer (PL 2,000) with a prep mixer equipped with roller blades. The Brabender Rheometer is a heated chamber which fits over two irregularly shaped rollers. A quantity of material is added to the chamber to 70% capacity by using the following expression: Sample charge=70%×mixer volume×specific gravity of sample. The sample is melted, and the total torque required to turn the rollers in the melt at a given rotational speed, which can be varied continuously, is measured with a dynamometer which includes a movable gear box coupled to a load cell by means of a torque arm. The unit is pre-calibrated but may be recalibrated. The polymer temperature is determined using a thermocouple which protrudes into the sample chamber. The data consists of measured values of torque (y-axis) and temperature at constant rotational speed vs. Time (x-axis), and represents the processability of the sample. The total amount of material used in the mixer was 250 g. The torque values were measured and recorded by a microprocessor as a function of time at half minute intervals at different temperatures. The tables present the values considered significant to the point being illustrated.

Torque is expressed as "meter-gms" or as "newton-meters". These can be easily converted to other units such as poise or pascal-sec. The unit derives from the use of the Brabender Torque Rheometer. Because the torque developed is related to the shear stress applied to the sample, the Rheometer can be used as a Melt Viscometer. The rotational speed of the mixing blades of the Brabender determines the maximum rate of shear to which the sample is subjected. Therefore apparent viscosity=$K_1$ (Torque/RPM) and Shear rate at the Wall=$K_2$×RPM. $K_1$ and $K_2$ are constants determined by Brabender for different types of bowl and blade. The values for the mixing bowl (Prep Mixer) used in the present invention are $K_1$=10,760 and $K_2$=2.47. Based on these equations, at 30 RPM, the shear rate is approximately 75 sec$^{-1}$ and 1 meter-gms (Torque) is approximately 360 poise or 36 Pa-sec (Apparent Viscosity).

The glass transition temperatures (Tg) of the plasticized proteinaceous materials from the torque Rheometer were determined using a Perkin Elmer Differential Scanning Calorimeter (DSC) 7 instrument at a heating rate of 20° C./min. Two heating scans were performed on each sample form −30° C. to +120° C. All the samples were dried in an oven at about 7020 C. before the thermal analysis.

The plasticized proteinaceous materials from the mixing bowl of the torque rheometer were compression molded using a Carver Press at room temperature at about 8,000 psi using molds with 4"×0.5"×0.125" dimensions (ASTM D 638).

A. ZEIN

Zein powder was mixed with different amounts of glycerol, propylene glycol and water for comparison, and the mixtures were heated in the prep mixer of the Brabender mixer from room temperature to 120° C. at 30 rpm. The plasticization of zein with water was conducted from 30° C. to 80° C. to avoid evaporation of water at higher temperatures.

Table 9 provides the torque values as a function of time for plasticization of zein with 20% plasticizer.

TABLE 9

Torque Values of Zein with 20% Plasticizer

| Time (Min.) | Glycerol | Propylene Glycol | Water |
|---|---|---|---|
| 0.5 | 756 | 897 | 829 |
| 1.0 | 756 | 897 | 829 |
| 2.0 | 665 | 897 | 829 |
| 3.0 | 711 | 2600 | 829 |
| 4.0 | 688 | 6144 | 829 |
| 5.0 | 3140 | 5511 | 1198 |
| 6.0 | 5042 | 3981 | 1244 |
| 7.0 | 6257 | 2313 | 2000 |
| 8.0 | 7185 | 1565 | 3386 |
| 9.0 | 4928 | 1197 | 2810 |
| 10.0 | 3690 | 989 | 2027 |
| 11.0 | 3140 | 805 | 1705 |
| 12.0 | 2842 | 713 | 1682 |

Peaks in the torque values, i.e. fusion peaks, which indicate the denaturation process in the protein structure under heat and shear, were observed for all three plasticizers. The fusion peaks occur at different temperatures when different plasticizers were used, i.e., 60° C., 80° C. and 100° C. for water, propylene glycol and glycerol, respectively. This indicates that the denaturation of zein varies with different plasticizers and as related to their structure and solubility parameter values.

Tables 10a–10c provide the fusion temperature, the fusion torque values and glass transition temperature values for the plasticized zein product as a function of plasticizer content.

TABLE 10a

Fusion Temperature (°C.) of Zein

| Plasticizer (%) | Glycerol | Propylene Glycol | Water |
|---|---|---|---|
| 10 | 130 | 120 | 95 |
| 15 | 110 | 105 | 75 |
| 20 | 100 | 80 | 60 |
| 25 | 90 | 70 | 60 |
| 30 | 90 | — | 60 |

TABLE 10b

Fusion Torque of Zein

| Plasticizer (%) | Glycerol | Propylene Glycol | Water |
|---|---|---|---|
| 10 | 18800 | 15000 | 14700 |
| 15 | 18500 | 6500 | 6000 |
| 20 | 8900 | 6000 | 3900 |
| 25 | 6000 | 3300 | 2300 |
| 30 | 3700 | — | 1500 |

TABLE 10c

Tg (°C.) of Plasticized Zein

| Plasticizer (%) | Glycerol | Propylene Glycol |
|---|---|---|
| 10 | 101 | 98 |
| 15 | 88 | 85 |
| 20 | 79 | 53 |
| 25 | 51 | 42 |
| 30 | 44 | — |

Table 10b shows that the torque values decrease in all cases and become constant after fusion of the proteins as no further aggregation occurs. Melt processing of zein should be carried out at temperatures when the torque values remain constant. This confirms the results obtained from the torque values. Although fusion of zein is best achieved by water followed by propylene glycol and glycerol poor stability makes water undesirable as a plasticizer. Cotton seed oil was also utilized as a plasticizer for zein in the above test but under the experimental conditions fusion did not occur.

Table 11 provides the torque values of zein as a function of plasticizer content at 120° C.

TABLE 11

Torque Values of Zein in 120° C.

| Plasticizer (%) | Glycerol | Propylene Glycol | Water |
|---|---|---|---|
| 10 | 15000 | 8500 | 12300 |
| 15 | 8000 | 2400 | 4000 |
| 20 | 2900 | 600 | 1700 |
| 25 | 800 | 350 | 850 |
| 30 | 500 | — | 600 |

The torque values decline exponentially with increasing amount of plasticizer, and the drop is the maximum for propylene glycol. The torque values for water were obtained at a lower temperature (i.e., 80° C.). Propylene glycol is the most efficient plasticizer among those exemplified.

Table 12 shows that a blend of plasticizers (75% glycerol and 25% propylene glycol) can be used to form a plasticized proteinaceous material with zein.

TABLE 12

Tg (°C.) of Plasticized Zein

| Plasticizer Blend,[a] Propylene Glycol (%) | Tg (°C.) |
|---|---|
| 0 | 51 |
| 5 | 45 |
| 10 | 40 |
| 15 | 40 |
| 20 | 35 |
| 25 | 42 |

[a] Glycerol + Propylene Glycol = 25%

Table 12 provides glass transition temperature values of the plasticized proteinaceous materials. The Tg values of zein as a function of propylene glycol in the blend of glycerol and propylene glycol are given. The Tg value of zein reduces to 35° C. in the presence of (15% glycerol+20% propylene glycol) as the plasticizers.

B. EGG WHITE

Egg white powder was mixed with 30% glycerol, and the mixture was heated in the mixing bowl of the Brabender from 30° C. to 120° C.

Table 13 provides the torque values for plasticization of egg white.

TABLE 13

Torque Values of Egg White

| Time (Min) | 20% Glycerol + 20% Water Temp = 30–80° C. | 25% Glycerol + 20% Water Temp = 30–80° C. | 30% Glycerol + 20% Water Temp = 30–80° C. | 30% Glycerol + 0% Water Temp = 30–120° C. |
|---|---|---|---|---|
| 1.0 | 4708 | 2191 | 1218 | 92 |
| 2.0 | 7137 | 3229 | 1505 | 138 |
| 3.0 | 9451 | 5120 | 1896 | 138 |
| 4.0 | 7391 | 4151 | 1253 | 173 |
| 5.0 | 6251 | 2791 | 896 | 277 |
| 6.0 | 6147 | 2306 | 827 | 1083 |
| 7.0 | 6009 | 2237 | 942 | 1821 |
| 8.0 | — | — | — | 4967 |
| 8.5 | — | — | — | 11479 |

As shown in Table 13, the torque value of the mixture increased to 12,000 mg after denaturation at about 80° C. Table 13 also provides the torque values of egg white from 30° C. to 80° C. with varying amounts of glycerol (20% to 30%) and fixed amount of water (20%). The fused mixture of egg white with glycerol alone was very brittle when examined after retrieving from the mixing bowl. Denaturation and aggregation processes in egg white protein is rapid. Water/glycerol blends allow for the melt processing of egg white without excessive aggregation of the protein but as indicated previously, water is undesirable as a plasticizer. The denaturation peak (fusion) is seen at about 50° C. followed by the drop in the torque to a constant value at higher temperature (75° C.). The fusion torque reduces when the amount of glycerol increases in the plasticizer blend. No further aggregation of egg white occurs due to the presence of water.

Table 14 shows the effect that shear rate can have on the denaturing process.

TABLE 14

Torque Values of Egg White at 25% Glycerol and 50° C.

| Time (Min) | 75 sec$^{-1}$ | 150 sec$^{-1}$ | 225 sec$^{-1}$ |
|---|---|---|---|
| 1.0 | 230 | 437 | 265 |
| 2.0 | 1000 | 1000 | 1800 |
| 3.0 | 1635 | 1000 | 2000 |
| 4.0 | 1635 | 2000 | 5143 |
| 5.0 | 1635 | 2500 | — |
| 5.5 | 1635 | 5555 | — |
| 6.0 | 1635 | — | — |
| 7.0 | 3000 | — | — |
| 8.0 | 7141 | — | — |

Egg white with 25% glycerol at 50° C. was processed at 75 sec$^{-1}$ and 225 sec$^{-1}$ shear rates. Higher shear rates provide additional energy to accelerate the aggregation process.

Tables 15 and 16 provide further examples of the use of blends as plasticizers with egg white as the protein. Varying amounts of glycerol and sorbitol were mixed in different ratios with the total amount of plasticizer content being maintained at 30%. Before blending with egg white, the mixed plasticizers were heated until sorbitol melted and formed a homogenous liquid with glycerol. The hot liquid was then mixed with egg white and processed in the mixing bowl at 50° C.

Table 15 provides the torque values of the denaturation.

TABLE 15

Torque Values of Egg White at 50° C.

| Time(Min) | 30% Glycerol/ 0% Sorbitol | 25% Glycerol/ 5% Sorbitol | 15% Glycerol/ 15% Sorbitol |
|---|---|---|---|
| 1.0 | 392 | 564 | 1106 |
| 2.0 | 1452 | 2246 | 2707 |
| 3.0 | 1521 | 1993 | 2787 |
| 4.0 | 1176 | 2235 | 2833 |
| 5.0 | 1014 | 2776 | 2626 |
| 6.0 | 1360 | 3732 | 1843 |
| 7.0 | 2063 | 6818 | 1843 |
| 8.0 | 4126 | — | 1682 |
| 8.5 | 6200 | — | 1739 |
| 9.0 | — | — | 1785 |
| 10.0 | — | — | 1981 |
| 12.0 | — | — | 2557 |
| 13.0 | — | — | 4227 |
| 13.5 | — | — | 6242 |

Denaturation occurred as was previously observed with pure glycerol. However, excessive aggregation was delayed considerably in the presence of 15% sorbitol. The higher amount of sorbitol in the blend was found to accelerate the aggregation process.

The Tg values of the plasticized egg white material as a function of sorbitol content in the glycerol/sorbitol blend are provided in Table 16.

TABLE 16

Tg (°C.) of Plasticized Egg White

| Sorbitol (%) | Tg |
|---|---|
| 0 | 38 |
| 5 | 37 |
| 10 | — |
| 15 | 34.8 |
| 20 | 28.6 |

Glycerol + Sorbitol = 30%

The Tg values drop with increasing amount of sorbitol. The optimum amount of sorbitol can be used with proteins as a plasticizer and a sweetener. Triethyl citrate and propylene glycol were also utilized as plasticizers for egg white but under the experimental conditions fusion did not occur.

C. MILK PROTEINS

Tables 17a–17c provide the melt plasticization of whey protein, sodium caseinate and TMP with different amounts of glycerol at 50° C.

TABLE 17a

Torque Values of Whey Protein at 50° C.

| Time (Min) | 20% Glycerol | 30% Glycerol | 40% Glycerol |
|---|---|---|---|
| 1.0 | 484 | 392 | 564 |
| 2.0 | 910 | 830 | 599 |
| 3.0 | 1762 | 1060 | 530 |
| 4.0 | 6565 | 6062 | 657 |
| 8.0 | — | — | 921 |
| 9.0 | — | — | 1359 |
| 10.0 | — | — | 2212 |
| 11.0 | — | — | 3294 |
| 12.0 | — | — | 5275 |
| 13.0 | — | — | 7763 |

TABLE 17b

Torque Values of Sodium Caseinate at 50° C.

| Time (Min) | 20% Glycerol | 30% Glycerol | 40% Glycerol |
|---|---|---|---|
| 1.0 | 622 | 230 | 450 |
| 3.0 | 784 | 738 | 1039 |
| 5.0 | 1210 | 830 | 1362 |
| 7.0 | 1729 | 1279 | 1501 |
| 8.0 | 4091 | 1567 | 1755 |
| 8.5 | 7952 | 2236 | 2205 |
| 9.0 | — | 3285 | 2286 |
| 10.0 | — | 5693 | 3394 |
| 11.0 | — | 7261 | 5460 |
| 11.5 | — | 9035 | 6246 |
| 12.0 | — | — | 6765 |
| 13.0 | — | — | 8035 |
| 14.0 | — | — | 9824 |

TABLE 17c

Torque Values of TMP at 60° C.

| Time (Min) | 30% Glycerol | 40% Glycerol | 50% Glycerol |
|---|---|---|---|
| 1.0 | 1176 | 495 | 669 |
| 2.0 | 1222 | 1555 | 761 |
| 3.0 | 1534 | 1590 | 738 |
| 4.0 | 2110 | 1774 | 876 |
| 5.0 | 2768 | 2557 | 830 |
| 6.0 | 4209 | 4607 | 853 |
| 7.0 | 7115 | 7510 | 876 |
| 7.5 | 13284 | 9802 | 876 |
| 8.0 | — | — | 969 |
| 12.0 | — | — | 2191 |
| 13.0 | — | — | 2998 |
| 14.0 | — | — | 3875 |
| 15.0 | — | — | 4855 |
| 16.0 | — | — | 6146 |
| 17.0 | — | — | 7242 |
| 18.0 | — | — | 8487 |
| 19.0 | — | — | 9064 |
| 20.0 | — | — | 9779 |

The data shown in Tables 17a–17c indicate that 20% and 30% glycerol cannot improve the processing of the whey protein as the aggregation process is followed almost immediately after the denaturation step. However, 40% glycerol delays the aggregation and improves the plasticization of the protein considerably. The processing window for sodium caseinate increases with increasing amount of the plasticizers. Poly(ethylene glycol) was also utilized as a plasticizer for whey protein but under the experimental conditions fusion did not occur.

Tables 18a and 18b provide the melt plasticization of sodium caseinate and TMP with propylene glycol at 50° C.

TABLE 18a

Torque Values of Sodium Caseinate at 50° C.

| Time (Min) | 30% Propylene Glycol | 40% Propylene Glycol | 50% Propylene Glycol |
|---|---|---|---|
| 1.0 | 3291 | 877 | 150 |
| 2.0 | 3646 | 1593 | 288 |
| 3.0 | 3841 | 1870 | 254 |
| 4.0 | 4667 | 1778 | 242 |
| 5.0 | 9288 | 1697 | 392 |
| 6.0 | — | 2055 | 622 |
| 7.0 | — | 2586 | 899 |
| 8.0 | — | 3440 | 1464 |
| 9.0 | — | 3209 | 2074 |

TABLE 18a-continued

Torque Values of Sodium Caseinate at 50° C.

| Time (Min) | 30% Propylene Glycol | 40% Propylene Glycol | 50% Propylene Glycol |
|---|---|---|---|
| 10.0 | — | 3556 | 2489 |
| 11.0 | — | 5033 | 2720 |
| 12.0 | — | 7203 | 2858 |
| 13.0 | — | — | 2996 |
| 14.0 | — | — | 3123 |
| 15.0 | — | — | 3181 |
| 16.0 | — | — | 3250 |

TABLE 18b

Torque Values of TMP at 50° C.

| Time (Min) | 30% Propylene Glycol | 40% Propylene Glycol | 50% Propylene Glycol |
|---|---|---|---|
| 1.0 | 750 | 402 | 288 |
| 2.0 | 1026 | 1356 | 449 |
| 3.0 | 1153 | 1839 | 460 |
| 4.0 | 1407 | 2115 | 483 |
| 5.0 | 2445 | 1781 | 737 |
| 6.0 | 7242 | 1655 | 1289 |
| 7.0 | 13642 | 1735 | 1646 |
| 8.0 | — | 2471 | 1911 |
| 9.0 | — | 2505 | 2072 |
| 10.0 | — | 3241 | 2222 |
| 11.0 | — | 4206 | 2268 |
| 12.0 | — | 6263 | 2337 |
| 13.0 | — | 8228 | 2394 |
| 14.0 | — | 9401 | 2464 |
| 15.0 | — | 9654 | 2510 |
| 16.0 | — | 9585 | 2625 |
| 17.0 | — | 9056 | — |
| 18.0 | — | 8837 | — |

The processing window for sodium caseinate increases with increasing amount of the plasticizers as was seen with glycerol. Excessive aggregation was not observed with 50% propylene glycol which was processed at 80° C. The data shows that this protein can be processed for extended periods of time and it can be used in continuous processes such as those using extruders. For milk Isolate (TMP) 40% and 50% propylene glycol eliminates excessive aggregation as was observed for sodium caseinate. The final torque values are very low.

Table 19 provides a comparison of the processing windows for egg white, whey, sodium caseinate and TMP proteins with glycerol as the plasticizer at 50° C.

TABLE 19

Processing Window Time (Min) for Proteins at 50° C. and Torque = 5,000 mg

| Glycerol (%) | Egg White | Whey | Caseinate | TMP |
|---|---|---|---|---|
| 20 | — | 3.75 | — | — |
| 25 | 7.5 | — | — | — |
| 30 | 8 | 4 | 8 | 6.5 |
| 40 | 16 | 12 | 9.75 | 6.5 |
| 50 | — | — | 10.75 | 15 |

In general, the processing of these proteins should preferably be carried out at low temperatures (50° C. to 70° C.) with a high amount of plasticizer.

Tables 20a and 20b provide the Tg of sodium caseinate and TMP using glycerol and propylene glycol as plasticizers, respectively.

TABLE 20a

Tg of Plasticized Milk Proteins

| Glycerol (%) | Caseinate | TMP |
|---|---|---|
| 30 | 59.5 | 60.5 |
| 40 | 46.4 | 53.8 |
| 50 | 41.2 | 34.8 |

TABLE 20b

Tg of Plasticized Milk Proteins

| Propylene Glycerol (%) | Caseinate | TMP |
|---|---|---|
| 30 | 45.7 | 60.9 |
| 40 | 42.7 | 48.6 |
| 50 | 40.6 | — |

As shown in Tables 20a and 20b the Tg values drop with increasing amount of the plasticizer content. Both plasticizers are shown to be efficient in reducing the Tg values.

Table 21 provides the torque value as a function of processing time of gelatin plasticized with different amounts of glycerol at 80° C.

TABLE 21

Torque Values of Gelatin at 80° C.

| Time (Min) | 10% Glycerol | 20% Glycerol | 30% Glycerol |
|---|---|---|---|
| 1.0 | 4792 | 738 | 277 |
| 2.0 | 13096 | 6984 | 795 |
| 3.0 | 13845 | 9220 | 1579 |
| 4.0 | 15158 | 10119 | 2743 |
| 5.0 | 16471 | 10165 | 3665 |
| 6.0 | 16817 | 10038 | 3965 |
| 7.0 | 17036 | 10015 | 4518 |
| 8.0 | 16702 | 10027 | 4817 |
| 9.0 | 16218 | 10073 | 5025 |
| 10.0 | 16056 | 10073 | 5209 |
| 11.0 | 15964 | 10073 | 5348 |
| 12.0 | 16033 | 10073 | 5532 |
| 13.0 | 16195 | 10074 | 5601 |
| 14.0 | 15792 | 10074 | 5762 |

For each experimental run, the torque increases almost immediately indicating the denaturation and aggregation process. The torque values remain constant even when gelatin is processed for longer times which indicates that excessive aggregation does not occur. Glycerol is shown to be an effective plasticizer for gelatin as the torque value decreases with increasing amount of plasticizer content. The torque values are lower when gelatin is processed at higher temperatures. Plasticized gelatin can be re-processed after cooling similar to a thermoplastic material. This indicates that the plasticized material can be very useful in a continuous process.

The parameters evaluated in the denaturing process, namely the processing torque values and processing temperatures, and the Tg values, found for several of the preferred plasticized proteinaceous materials are summarized in Table 22.

TABLE 22

Summary of the Protein Properties

| Material | Plasticizer | Torque, mg | Temp, °C. | Tg, °C. |
|---|---|---|---|---|
| Zein | 25% PG | 350 | 120 | 42 |
|  | 30% Glycerol | 500 | 120 | 44 |

TABLE 22-continued

Summary of the Protein Properties

| Material | Plasticizer | Torque, mg | Temp, °C. | Tg, °C. |
|---|---|---|---|---|
| Egg White | 40% Glycerol | 5000 | 50 | 34 |
|  | 15% Glycerol + 15% Sorbital | 5000 | 50 | 35 |
| Caseinate | 50% PG | 3250 | 80 | 40 |
|  | 50% Glycerol | 5000 | 50 | 41 |
| TMP | 50% PG | 2500 | 80 | 35 |
|  | 50% Glycerol | 5000 | 50 | 35 |

Tables 23 to 29 provide mechanical properties found for plasticized proteinaceous materials prepared by the process of the present invention. The decrease in modulus and strength, and the increase in the elongation at break values of the plasticized proteinaceous materials illustrates the efficiency of plasticization process in providing a useful end product.

Molded sheets were prepared by compression molding the plasticized proteinaceous materials proteins using a Carver Press at temperatures ranging from 80°–120° C. at 8,000 psi for 5 minutes. The dimensions of the molds were 127 mm×114.3 mm×3.175 mm which corresponds to about 50 g of material (assuming density=1 g/cc) for each molding experiment. Teflon sheets were placed between the protein and the metal plates to avoid any sticking problems during the sample removal process after the molding experiment. In order to determine the mechanical properties of the plasticized proteinaceous materials, the molded sheets were cut in 127 mm×12.7 mm×3.175 mm dimensions. A band-saw was used to cut the sheets into the required dimensions as some of the samples were difficult to cut using a blade. The gum-base ingredients were cut using a hot-knife as they were very brittle. Tensile testing was carried out on an Instron Testing System using a 100 kg load cell at 50.8 mm/min on tensile specimens with 50.8 mm gauge length, 12.7 mm width and 3.175 mm thickness following the ASTM D 638 method. The results represents an average of at least 10 specimens for each plasticized proteinaceous material. The following tables summarize the mechanical properties of the plasticized proteinaceous materials.

TABLE 23

Mechanical Properties of Plasticized Zein

| ZEIN/ PLASTICIZERS | Maximum Stress (Kgf/mm$^2$) | Modulus (Kgf/mm$^2$) | Strain at Break (%) |
|---|---|---|---|
| 10% Glycerol | 2.4 | 104.5 | 2.6 |
| 25% Glycerol | 1.2 | 87.0 | 1.9 |
| 30% Glycerol | 0.7 | 47.4 | 1.7 |
| 15% PG | 2.3 | 85.9 | 3.2 |
| 20% PG | 1.0 | 43.6 | 18.2 |
| 25% PG | 0.1 | 5.2 | 292.0 |

TABLE 24

Mechanical Properties of Plasticized Gelatin

| GELATIN/ PLASTICIZERS | Maximum Stress (Kgf/mm$^2$) | Modulus (Kgf/mm$^2$) | Strain at Break (%) |
|---|---|---|---|
| 10% Glycerol | — | — | — |
| 20% Glycerol | 0.7 | 18.6 | 153.3 |
| 30% Glycerol | 0.3 | 0.7 | 256.0 |

TABLE 25

Mechanical Properties of Plasticized Gliadin

| GLIADIN/<br>PLASTICIZERS | Maximum Stress<br>(Kgf/mm$^2$) | Modulus<br>(Kgf/mm$^2$) | Strain at Break<br>(%) |
|---|---|---|---|
| 30% Glycerol | 0.2 | 1.7 | 131 |
| 40% Glycerol | 0.05 | 0.08 | 293 |
| 50% Glycerol | 0.02 | 0.02 | 398 |

TABLE 26

Mechanical Properties of Plasticized Egg White

| EGG WHITE/<br>PLASTICIZERS | Maximum Stress<br>(Kgf/mm$^2$) | Modulus<br>(Kgf/mm$^2$) | Strain at Break<br>(%) |
|---|---|---|---|
| 20% Glycerol | 1.8 | 91.1 | 3.3 |
| 30% Glycerol | 1.1 | 30.4 | 75.1 |
| 40% Glycerol | 0.8 | 14.9 | 93.1 |
| 50% Glycerol | 0.5 | 4.5 | 81.4 |
| 25% Glycerol<br>5% Sorbitol | 1.5 | 43.8 | 77.5 |
| 15% Glycerol<br>15% Sorbitol | 1.6 | 58.7 | 6.2 |
| 9% Glycerol<br>21% Sorbitol | 2.2 | 78.6 | 3.4 |

TABLE 27

Mechanical Properties of Plasticized Sodium Caseinate

| CASEINATE/<br>PLASTICIZERS | Maximum Stress<br>(Kgf/mm$^2$) | Modulus<br>(Kgf/mm$^2$) | Strain at Break<br>(%) |
|---|---|---|---|
| 30% Glycerol | 0.9 | 30.3 | 16.8 |
| 40% Glycerol | 0.3 | 7.1 | 25.9 |
| 50% Glycerol | 0.14 | 1.8 | 44.3 |
| 30% PG | 0.6 | 21.1 | 18.5 |
| 40% PG | 0.2 | 1.9 | 41.8 |
| 50% PG | 0.1 | 0.7 | 52.5 |

TABLE 28

Mechanical Properties of Plasticized Whey Concentrate

| WHEY/<br>PLASTICIZERS | Maximum Stress<br>(Kgf/mm$^2$) | Modulus<br>(Kgf/mm$^2$) | Strain at Break<br>(%) |
|---|---|---|---|
| 30% Glycerol | 0.6 | 26.1 | 2.9 |
| 40% Glycerol | 0.1 | 3.5 | 6.5 |

TABLE 29

Mechanical Properties of Plasticized Milk Isolates

| TMP/<br>PLASTICIZERS | Maximum Stress<br>(Kgf/mm$^2$) | Modulus<br>(Kgf/mm$^2$) | Strain at Break<br>(%) |
|---|---|---|---|
| 30% Glycerol | 0.9 | 27.9 | 17.2 |
| 40% Glycerol | 0.3 | 6.8 | 51.4 |
| 50% Glycerol | 0.2 | 1.9 | 57.3 |
| 30% PG | 0.5 | 14.4 | 25.8 |
| 40% PG | 0.2 | 1.9 | 41.6 |
| 50% PG | 0.1 | 0.5 | 47.9 |

Table 30 shows the mechanical properties for traditional gum ingredients.

TABLE 30

Mechanical Properties of Gum Base Ingredients

| INGREDIENTS | Maximum Stress<br>(Kgf/mm$^2$) | Modulus<br>(Kgf/mm$^2$) | Strain at Break<br>(%) |
|---|---|---|---|
| Butyl Rubber | 0.015 | 0.044 | 299.4 |
| PVA (AYAC) | 0.2 | 19.5 | 0.9 |
| Wax 175 | 0.15 | 11.2 | 7.5 |

Table 31 provides a sensory evaluation of several of the plasticized proteinaceous materials prepared in the prior section. The effects upon chewing were evaluated by a panel of persons skilled in the gum arts. Table 31 compares these sensory results with those that would be predicted for these plasticized proteinaceous materials by a comparison of their mechanical properties with the mechanical properties listed in Table 30 for the conventional gum components; butyl rubber (rubbery), PVA (stretch) and wax (waxy). The comparison shows a correlation between experimental sensory properties and the predicted sensory properties of the plasticized proteinaceous materials based on their mechanical properties.

TABLE 31

Comparison Between Analytical and Sensory Evaluation

| PLASTICIZED<br>PROTEINACEOUS<br>MATERIALS | SENSORY<br>EVALUATION<br>(BRABENDER<br>SAMPLES) | ANALYTICAL<br>EVALUATION<br>(MECH.<br>PROPERTIES) |
|---|---|---|
| 30% G/EW | PE WAX | Waxy, % Strain is low |
| 40% G/EW | SOFT WAX; LOW M.P.<br>(E.G., CARNUBA);<br>LEACHING | Waxy, % Strain is<br>relatively high. Softer<br>than the above sample. |
| 15% S–15% G/EW | FIRMER THAN ABOVE;<br>NO LEACHING (E.G.,<br>WAX 175) | Waxy, % Strain is low |
| 40% G/WHEY | WAXY; STICKY;<br>LMW WAX | Waxy, % Strain is low |
| 50% G/CASEIN | RUBBERY | Rubbery, % Strain<br>is high |
| 30% G/TMP | RUBBER BAND;<br>BREAKS GRADUALLY | Waxy, % Strain is low |
| 40% PG/TMP | RUBBERY | Rubbery, % Strain<br>is high |
| 50% PG/TMP | RUBBERY; BITTER | Rubbery, % Strain<br>is high |
| 30% G/GELATIN | RUBBERY | Rubbery, % Strain<br>is very high |

Based on the above evaluation, the mechanical properties of the plasticized proteinaceous materials can be used to define their utility as gum components.

II. EXTRUDER PREPARATION

This example illustrates the use of protein mixtures with plasticizers to prepare plasticized proteinaceous materials. An extruder was used as the processing apparatus.

Protein-plasticizer blends were melt processed using a counter-rotating conical twin-screw extruder (C. W. Brabender) with metering screw equipped with a rod or a ribbon die. The extruder has three barrel heater/cooling temperature and 1 or 2 die zones. A pressure transducer and a thermocouple were attached at the end of the third zone and the die, respectively, in order to monitor the pressure and the melt temperature during the extrusion process. All of the processing parameters, including the torque and the rpm, could be controlled by a computer and were directly printed during the extrusion of the plasticized proteinaceous material. Typical processing conditions were as follows:

| | |
|---|---|
| Processing Temperature (Zones 1 to 4): | 70–100° C. |
| Processing torque: | 500–3000 mg |
| Head pressure: | 80–600 psi |
| RPM: | 20–40 |

The proteins were pre-mixed in different ratios, and were then vigorously mixed with different amounts of plasticizers. The mixtures were then extruded by feeding them through the hopper. The extrudates were collected in the strand form and were analyzed.

The torque values of several of the plasticized proteinaceous materials determined during extrusion are presented below in Tables 32 and 33.

TABLE 32

Torque Values for Gelatin-Based Blends with 30% Glycerol

| Protein (%) | TMP | Casein | Gliadin |
|---|---|---|---|
| 0 | 2600 | 2600 | 2600 |
| 10 | 2100 | 1000 | 1800 |
| 30 | 2500 | 2500 | 2000 |
| 50 | 4000 | 5000 | 2500 |
| 100 | 13000 | 8000 | 5000 |

TABLE 33

Torque Values of Zein-Based Blends with 30% PG

| Protein (%) | TMP | Casein |
|---|---|---|
| 0 | 1200 | 1200 |
| 10 | 2000 | 2000 |
| 30 | 1500 | 2600 |
| 50 | 2000 | 3000 |
| 100 | 14000 | 10000 |

The extruded protein strands were cut and compression molded at about 80° C. at 8,000 psi. The mechanical properties were determined using the same specimen dimensions and testing conditions as described in Example 2. Tables 34–41 summarize the properties of the various plasticized proteinaceous materials.

TABLE 34

Mechanical Properties of Gelatin/Sodium Caseinate/30% Glycerol

| BLEND RATIOS | Maximum Stress (Kgf/mm$^2$) | Modulus (Kgf/mm$^2$) | Strain at Break (%) |
|---|---|---|---|
| 90 Gelatin:10 Cas | 0.62 | 1.6 | 184.2 |
| 70 Gelatin:30 Cas | 0.48 | 6.3 | 52.0 |
| 50 Gelatin:50 Cas | 0.47 | 5.5 | 83.3 |

TABLE 35

Mechanical Properties of Gelatin/TMP/30% Glycerol

| BLEND RATIOS | Maximum Stress (Kgf/mm$^2$) | Modulus (Kgf/mm$^2$) | Strain at Break (%) |
|---|---|---|---|
| 90 Gelatin:10 TMP | 0.46 | 0.84 | 214.6 |
| 70 Gelatin:30 TMP | 0.7 | 3.9 | 125.6 |
| 50 Gelatin:50 TMP | 0.4 | 4.4 | 97.6 |

TABLE 36

Mechanical Properties of Gelatin/Gliadin/30% Glycerol

| BLEND RATIOS | Maximum Stress (Kgf/mm$^2$) | Modulus (Kgf/mm$^2$) | Strain at Break (%) |
|---|---|---|---|
| 90 Gelatin:10 Gliadin | 0.34 | 0.63 | 233.6 |
| 70 Gelatin:30 Gliadin | 0.29 | 0.75 | 215.0 |
| 50 Gelatin:50 Gliadin | 0.20 | 0.52 | 256.0 |

TABLE 37

Mechanical Properties of Gelatin/Zein/30% Glycerol

| BLEND RATIOS | Maximum Stress (Kgf/mm$^2$) | Modulus (Kgf/mm$^2$) | Strain at Break (%) |
|---|---|---|---|
| 90 Gelatin:10 Zein | 0.41 | 1.1 | 164.2 |
| 70 Gelatin:30 Zein | 0.28 | 5.4 | 34.7 |
| 50 Gelatin:50 Zein | 0.48 | 20.9 | 9.1 |

TABLE 38

Mechanical Properties of Zein/Sodium Caseinate/30% PG

| BLEND RATIOS | Maximum Stress (Kgf/mm$^2$) | Modulus (Kgf/mm$^2$) | Strain at Break (%) |
|---|---|---|---|
| 90 Zein:10 Cas | 0.09 | 1.6 | 166.8 |
| 70 Zein:30 Cas | 0.11 | 1.9 | 159.4 |
| 50 Zein:50 Cas | 0.07 | 0.8 | 152.9 |

TABLE 39

Mechanical Properties of Zein/TMP/30% PG

| BLEND RATIOS | Maximum Stress (Kgf/mm$^2$) | Modulus (Kgf/mm$^2$) | Strain at Break (%) |
|---|---|---|---|
| 90 Zein:10 TMP | 0.03 | 0.43 | 409.6 |
| 70 Zein:30 TMP | 0.04 | 0.65 | 330.4 |
| 50 Zein:50 TMP | 0.04 | 0.43 | 232.4 |

TABLE 40

Mechanical Properties of Zein/Egg White/30% Glycerol

| BLEND RATIOS | Maximum Stress (Kgf/mm$^2$) | Modulus (Kgf/mm$^2$) | Strain at Break (%) |
|---|---|---|---|
| 80 Zein:20 EW | 1.1 | 59.3 | 2.7 |
| 50 Zein:50 EW | 1.0 | 41.2 | 5.6 |

TABLE 41

Mechanical Properties of Gelatin/Caseinate/Zein/30% Glycerol

| BLEND RATIOS | Maximum Stress (Kgf/mm$^2$) | Modulus (Kgf/mm$^2$) | Strain at Break (%) |
|---|---|---|---|
| 31 Gel:19 Cas:19 Zein | 0.5 | 11.3 | 45.1 |

EXAMPLE 3

Gum Preparation with Plasticized Proteinaceous Materials

This example illustrates the preparation of gum bases and chewing gums containing plasticized proteinaceous materials of the present invention. The example illustrates both the use of pre-made plasticized proteinaceous materials prepared according to the process of the present invention and the formation of the gum product without isolation of the plasticized proteinaceous material. Both the use of a mixing bowl (batch operation) and extruder (continuous operation) are illustrated.

A. Gum Base Preparation

This example illustrates the preparation of gum base. Subexamples A1 and A2 illustrate the use of plasticized proteinaceous materials as prepared in accordance with prior Examples 1 and 2. Subexample A3 illustrates the preparation of a gum base in one step, i.e., without isolation of the plasticized proteinaceous material.

Subexample A1

Gelatin

This example illustrates a gum base prepared without traditional elastomer.

| Ingredient | Parts (gms) |
| --- | --- |
| Gelatin/30% Glycerol | 30.00 |
| Filler | 43.50 |
| Resin | 52.47 |
| PVA | 50.00 |
| Wax | 22.50 |
| Fat | 12.50 |
| Emulsifier | 2.50 |
| Antioxidant | 6.45 |
| TOTAL | 249.92 |

A pre-Extruded plasticized proteinaceous material made from gelatin with 30% glycerol was added to a Brabender mixing bowl at 100° C., and was processed for 4 minutes (torque=4,000 mg). The remainder of the gum-base ingredients were added to the bowl in the order as listed.

Subexample A2

Gelatin and Egg White

This example illustrates a gum base prepared without elastomer and PVA.

| Ingredient | Parts (gms) |
| --- | --- |
| Gelatin/30% Glycerol | 30.00 |
| Filler | 43.50 |
| Resin | 82.47 |
| Egg White/40% Glycerol | 50.00 |
| Wax | 22.50 |
| Fat | 12.50 |
| Emulsifier | 2.50 |
| Antioxidant | 6.45 |
| TOTAL | 249.92 |

A pre-extruded plasticized proteinaceous material made from gelatin, egg white and glycerol was added to a Brabender mixer at 100° C. to prepare gum base as above.

Subexample A3

Zein

This example illustrates the replacement of traditional elastomer, PVAc and wax.

| Ingredient | Parts (gms) |
| --- | --- |
| Zein | 22.12 |
| Glycerol | 14.46 |
| Filler | 18.41 |
| Gliadin-Gelatin Blends | 16.40 |
| RS-5 Wood Resin | 159.28 |
| Oil | 9.03 |
| Fat | 9.03 |
| TOTAL | 248.73 |

The gum base was prepared using a Berstoff extruder configured to have eight barrels with an L/D of 40. The rpm was 200 and the temperature ranged from 50° C. to 85° C. The protein was added to the initial barrel heated at 50° C. with plasticizer added to the second barrel. The protein-plasticizer blend was exposed to high shear at a temperature of from 75° C. to 80° C. The resin and fat were added to the third barrel. The filler was added with the zein.

B. Chewing Gum Preparation

This example illustrates the preparation of chewing gums. Subexamples B1, B7, B8, B9 and B10 illustrate the preparation of a chewing gum in one-step, i.e., without isolation of the plasticized proteinaceous material. Subexamples B2–B4 illustrate the use of pre-made plasticized proteinaceous material as prepared in prior examples. Subexamples B5 and B6 illustrate the use of pre-made plasticized proteinaceous material with additional protein.

Subexample B1

Zein-Based Gum Formulation

In this example the plasticized proteinaceous materials are substituted for the elastomer, PVAc and was used in traditional formulas.

| Ingredient | Parts (gms) |
| --- | --- |
| Zein | 22.12 |
| Glycerol | 14.46 |
| Filler | 18.41 |
| Gliadin-Gelatin Blends | 16.40 |
| RS-5 Wood Resin | 159.28 |
| Oil | 9.03 |
| Fat | 9.03 |
| Bulk Sweetener | 96.80 |
| Flavor | 6.23 |
| Intense Sweetener | 1.25 |
| Lecithin | 1.75 |
| TOTAL | 354.76 |

The chewing gum was prepared in a Brabender mixing bowl at 30 rpm from an initial temperature of 105° C. to 50° C. until homogeneous. The ingredients were added in the order listed. The bulk sweetener was predissolved in 20 ml water.

The above gum formulation was compared by a test panel with a commercial gum product for initial chew hardness, pliability, bitterness, flavor, sweetness, waxiness, hardness, moisture, cohesiveness, adhesiveness and springiness over time. The panelists determined that the Subexample B1 gum was similar in initial chew hardness and pliability and also in overall hardness, moistness, springiness, flavor and sweetness to the commercial product. The gum of Subexample B1 was found to have a high bitter character and much stronger waxy character.

Subexample B2

Gliadin-Based Gum Formulation

This Subexample and Subexamples B3–B6 illustrate the use of pre-made plasticized proteinaceous materials to replace the traditional use of elastomer, PVAc and wax.

| Ingredient | Parts (gms) |
| --- | --- |
| Gliadin | 26.58 |
| Glycerol | 26.58 |
| Filler | 18.41 |
| RS-5 Wood Resin | 159.28 |
| Oil | 9.03 |
| Fat | 9.03 |
| Bulk Sweetener | 96.80 |
| Flavor | 4.73 |
| Intense Sweetener | 1.26 |
| Lecithin | 1.75 |
| TOTAL | 353.45 |

A plasticized proteinaceous material containing gliadin/gelatin and glycerol was added to a Brabender mixing bowl at 100° C., and the remaining ingredients were added to the bowl in the order as listed.

Subexample B3

Gliadin/Gelatin Blend Gum Formulation

| Ingredient | Parts (gms) |
| --- | --- |
| Gliadin | 22.11 |
| Gelatin | 22.11 |
| Glycerol | 18.95 |
| Filler | 18.41 |
| RS-5 Wood Resin | 159.28 |
| Oil | 9.03 |
| Fat | 9.03 |
| Bulk Sweetener | 96.80 |
| Flavor | 6.23 |
| Intense Sweetener | 1.26 |
| Lecithin | 1.75 |
| TOTAL | 364.96 |

The formula was processed in a manner to Subexample B1.

Subexample B4

Gelatin/Glycerol Gum Formulation (Without the Gliadin-Gelatin Blend)

| Ingredient | Parts (gms) |
| --- | --- |
| Gelatin | 37.21 |
| Glycerol | 15.95 |
| Filler | 18.41 |
| RS-5 Wood Resin | 159.28 |
| Oil | 9.03 |
| Fat | 9.03 |
| Bulk Sweetener | 55.35 |

-continued

| Ingredient | Parts (gms) |
| --- | --- |
| Flavor | 6.23 |
| Intense Sweetener | 1.26 |
| Lecithin | 1.75 |
| TOTAL | 313.50 |

The formula was processed in a manner similar to Subexample B1. A panel evaluated the gum to assess the sensory characteristics. The gum was found to have a texture close to traditional gum with more springiness. After an initial hard chew it softened. The waxy character was found to be one of taste over texture.

Subexample B5

Gelatin/Zein/Glycerol Gum Formulation

In this example a plasticized proteinaceous material made from gelatin, zein and glycerol were pre-melt plasticized, followed by the addition of a gelatin-gliadin blend and further plasticized.

| Ingredient | Parts (gms) |
| --- | --- |
| Gelatin | 12.80 |
| Zein | 12.80 |
| Glycerol | 10.97 |
| Gelatin-Gliadin Blend | 16.50 |
| Filler | 18.41 |
| RS-5 Wood Resin | 159.28 |
| Oil | 9.03 |
| Fat | 9.03 |
| Bulk Sweetener | 55.35 |
| Flavor | 6.23 |
| Intense Sweetener | 1.26 |
| Lecithin | 1.75 |
| TOTAL | 313.41 |

This example was processed in a manner similar to Subexample B1. A panel evaluated the gum to assess the sensory characteristics. The gum was found to have a hard, taffy-like chew which tended toward a rubbery character. The gum was evaluated as having waxy properties associated with a chewing gum.

Subexample B6

Gelatin/Glycerol Gum Formulation

In this example a plasticized proteinaceous material made from gelatin and glycerol was pre-melt plasticized, followed by the addition of a gelatin-gliadin blend and further plasticized.

| Ingredient | Parts (gms) |
| --- | --- |
| Gelatin | 25.60 |
| Glycerol | 10.97 |
| Gelatin-Gliadin Blend | 16.50 |
| Filler | 18.41 |
| RS-5 Wood Resin | 159.28 |
| Oil | 9.03 |
| Fat | 9.03 |
| Bulk Sweetener | 55.35 |
| Flavor | 6.23 |

-continued

| Ingredient | Parts (gms) |
|---|---|
| Intense Sweetener | 1.26 |
| Lecithin | 1.75 |
| TOTAL | 313.41 |

This example was processed in a manner similar to Subexample B1. A panel evaluated the gum to assess the sensory characteristics. The gum which was found to be initially firm, and thereafter was found to soften quickly and to have less cohesion than a traditional chew.

Subexample B7

Zein Formulations

The following example shows the preparation of a gum having the resin, rubber and PVAc replaced by a plasticized proteinaceous material of the present invention. The ingredients used to formulate the gum are shown below:

| Ingredient | WT | % |
|---|---|---|
| Zein (corn protein) | 150.92 | 30.19 |
| Propylene Gycol | 64.68 | 12.94 |
| Two-Phase Oil/Water Emulsion | 20.02 | 4.0 |
| CaCO$_3$ | 60.0 | 12.0 |
| Microcrystalline Wax | 14.14 | 2.82 |
| Hydrolyzed Cottonseed Oil | 17.67 | 3.53 |
| Glycerol Monostearate | 4.69 | 1.0 |
| Soy oil | 5.88 | 1.17 |
| Flavor | 7.07 | 1.41 |
| Aspartame | 4.69 | 1.0 |

The zein, propylene glycol, emulsion and CaCO$_3$ were mixed in a bowl. The mixture was heated in a Brabender at 80° C. for two minutes. The wax component was added and the resulting mixture cooled to 70° C. The oil, emulsifier and soy oil were added under mixing and the resulting mixture was cooled to 50° C. Sweeteners and flavor were then added and mixed for two minutes.

The resulting gum exhibited rapid hydration, a rubbery initial chew and a smooth texture in the mouth.

Subexample B8

Gluten Formulation

The following example shows the preparation of a chewing gum having all gum base materials replaced with a plasticized proteinaceous material in accordance with the present invention. The ingredients used to formulate the gum are shown below:

| Ingredients | WT | % |
|---|---|---|
| Gluten | 136.37 | 54.00 |
| Cellulose | 19.25 | 7.62 |
| Gycerine | 40.92 | 16.20 |
| H$_2$O | 25.00 | 9.89 |
| Flavor oil | 4.00 | 1.58 |
| Sweetener | 0.50 | 0.20 |
| Wesson oil | 0.60 | 0.24 |
| Lycasin | 6.00 | 2.37 |
| Sorbitol | 20.00 | 0.08 |

The ingredients were combined in a manner similar to that described in Subexample B7. The resulting gum exhibited excellent elasticity, bounce and chewability.

Subexample B9

Zein Formulation

The following example shows the preparation of a chewing gum in which rubber is replaced by a plasticized proteinaceous material of the present invention. The ingredients used to formulate the gum are shown below:

| Ingredient | % By Weight |
|---|---|
| Zein | 19.86 |
| Glycerine | 8.41 |
| Two-Phase Oil/Water Emulsion | 5.72 |
| Resin (wood rosin ester) | 33.33 |
| Microcrystalline Wax | 4.04 |
| Hydrolyzed Cottonseed Oil | 5.05 |
| Glycerol Monostearate | 1.34 |
| CaCO$_3$ | 17.17 |
| Flavor | 2.02 |
| Aspartame | 1.34 |
| Soy Oil | 1.68 |

The zein, glycerine, emulsion and CaCO$_3$ were mixed in a bowl. The mixture was heated in a Brabender at 85° C. for two minutes. The wax component was added over 15 minutes at 85° C. The oil and emulsifier were added over 15 minutes under mixing and the resulting mixture was cooled to 70° C. Sweetener, flavor and soy oil were then added over 5 minutes and mixed at 40° C.

The gum composition showed exceptional potential for a replacement of a synthetic gum base. The composition shows elasticity, bounce, chewability and gives chewing attributes immediately upon chewing.

Subexample B10

Zein Formulation

The following example shows the preparation of a chewing gum in which resin, rubber and PVAc are replaced with a plasticized proteinaceous material of the present invention. The ingredients used to formulate the gum are shown below:

| Ingredients | % By Weight |
|---|---|
| Zein | 27.27 |
| Propylene glycol | 20.45 |
| CaCO$_3$ | 11.36 |
| Sugar | 28.40 |
| Corn syrup | 4.54 |
| Lecithin | 3.40 |
| Acetic acid | 0.45 |
| Flavor | 1.13 |
| Sweeteners | 1.17 |

The zein and propylene glycol were mixed in a bowl. The mixture was heated in a Brabender at 60° C. for 5 minutes. CaCO$_3$ and sugar were added and mixed for 10 minutes ad the resulting mixture cooled to 55° C. The corn syrup and lecithin were added under mixing for 10 minutes and the resulting mixture was cooled to 50° C. Acetic acid, sweetener and flavor were then added and mixed for 10 minutes at 50° C.

The resulting gum exhibited rapid hydration, a rubbery initial chew and a smooth texture in the mouth.

EXAMPLE 4

Subexample C1

Nougat Formulation

A soft nougat confectionery product in accordance with the present invention was prepared from the ingredients shown below:

| Ingredient | % By Weight |
|---|---|
| Gelatin | 1.13 |
| Gum Arabic | 0.34 |
| Corn syrup 44Be | 16.36 |
| Water | 1.75 |
| Granulated sugar | 38.87 |
| Gorn syrup 44b | 30.07 |
| Fat | 1.83 |
| Flavor | 0.50 |
| Demineralized whey protein | 1.50 |
| Glycerol | 0.33 |
| Pulverized sugar | 2.74 |
| Cellulose powder | 0.91 |

A frappe was formed by adding the gelatin to hot tap water (60 gm) and mix until dissolved. The solution was allowed to stand for 30 minutes. Gum Arabic was added to cold tap water (27.5 gm) and treated in the same manner as the gelatin. The gelatin and gum Arabic solutions were added to 818.0 gm of warm 44Be corn syrup in a Hobart mixer and mixed therein at low and then moderate speeds for a total of 4 minutes.

A Bob syrup was prepared by mixing 1503.5 gm of 44 Be corn syrup, 943.5 gm of granulated sugar and 600 ml of water. The mixture was heated at 130° C.

The Bob syrup was slowly added to the Frappe under mixing for about 5 minutes. Cellulose powder was added under mixing for 2 minutes followed by the successive addition of sugar and fat. Thereafter the demineralized whey protein/glycerol plasticized proteinaceous material was added under mixing followed by the addition of the sweeteners and flavors.

The resulting nougat exhibits all of the properties including chewability and texture of a conventional nougat.

Subexamples C2–C4

Nougat Formulations

The method of Subexample C1 was repeated except that glycerol (0.33% by weight) was replaced with the same amount of ethyl lactate (Subexample C2), lactic acid (Subexample C3) and butyl lactate (Subexample C4), respectively. The resulting nougats produced in accordance with Subexamples C2–C4 exhibited all of the properties of a conventional nougat including chewability and texture.

What is claimed:

1. A method of identifying compatible proteins and plasticizers for the formation of a plasticized proteinaceous material comprising
    a) selecting a protein component;
    b) determining the solubility parameter of the protein component defined by the Formula I $$\delta_1^2 = \delta_{D1}^2 + \delta_{P1}^2 + \delta_{H1}^2 \qquad (I)$$

wherein $\delta_1$ is the total solubility parameter value of the protein component;

$\delta_{D1}$ is the solubility parameter value contributed by dispersive forces of the protein component;

$\delta_{P1}$ is the solubility parameter value contributed by the polar forces of the protein component; and $\delta_{H1}$ is the solubility parameter value contributed by hydrogen bonding forces of the protein component;

c) selecting a plasticizer component having a second solubility parameter defined by the Formula (II)

$$\delta_2^2 = \delta_{D2}^2 + \delta_{P2}^2 + \delta_{H2}^2 \qquad (II)$$

wherein $\delta_2$ is the total solubility parameter value of the plasticizer component;

$\delta_{D2}$ is the solubility parameter value contributed by dispersive forces of the plasticizer component;

$\delta_{P2}$ is the solubility parameter value contributed by the polar forces of the plasticizer component; and $\delta_{H2}$ is the solubility parameter value contributed by hydrogen bonding forces of the plasticizer component; and matching a protein component with a plasticizer component wherein at least one of the following pairs of solubility parameter values $\delta_1$–$\delta_2$, $\delta_{D1}$–$\delta_{D2}$, $\delta_{P1}$–$\delta_{P2}$ and $\delta_{H1}$–$\delta_{H2}$ are within 15% of each other.

2. The method of claim 1 wherein at least one of the pairs of solubility parameter values are within 10% of each other.

3. The method of claim 1 wherein $\delta_1$ and $\delta_2$ are within 15% of each other.

4. The method of claim 1 wherein $\delta_{D1}$ and $\delta_{D2}$ are within 15% of each other.

5. The method of claim 1 further comprising calculating the free volume of the matched protein and plasticizer components in accordance with the Formula (III)

$$FV = 0.025 + \alpha_d(T-Tg_d) + \alpha_p(T-Tg_p) \qquad (III)$$

wherein

FV is the free volume, $\alpha_p$ is the coefficient of thermal expansion of the protein component;

$\alpha_d$ is the coefficient of thermal expansion of the plasticizer component;

$Tg_d$ is the glass transition temperature of the plasticizer component;

$Tg_p$ is the glass transition temperature of the protein component; and

T is a reference temperature;

and identifying the matched protein and plasticizer components that have the highest free volume.

6. A method of producing a plasticized proteinaceous material comprising:
    a) selecting a protein component having a first solubility parameter defined by the Formula (I)

$$\delta_1^2 = \delta_{D1}^2 + \delta_{P1}^2 + \delta_{H1}^2 \qquad (I)$$

wherein $\delta_1$ is the total solubility parameter value of the protein component;

$\delta_{D1}$ is the solubility parameter value contributed by dispersive forces of the protein component;

$\delta_{P1}$ is the solubility parameter value contributed by the polar forces of the protein component;

$\delta_{H1}$ is the solubility parameter value contributed by hydrogen bonding forces of the protein component;

b) selecting a plasticizer component having a second solubility parameter defined by the Formula (II)

$$\delta_2{}^2 = \delta_{D2}{}^2 + \delta_{P2}{}^2 + \delta_{H2}{}^2 \quad \text{(II)}$$

wherein $\delta_2$ is the total solubility parameter value of the plasticizer component;

$\delta_{D2}$ is the solubility parameter value contributed by dispersive forces of the plasticizer component;

$\delta_{P2}$ is the solubility parameter value contributed by the polar forces of the plasticizer component; and $\delta_{H2}$ is the solubility parameter value contributed by hydrogen bonding forces of the plasticizer component; wherein at least one of the following pairs of solubility parameter values $\delta_1$–$\delta_2$, $\delta_{D1}$–$\delta_{D2}$, $\delta_{P1}$–$\delta_{P2}$, and $\delta_{H1}$–$\delta_{H2}$ are with 15% of each other, c) combining the matched protein and plasticizer components to form a blend and treating the blend to form a plasticized proteinaceous material wherein the plasticizer component is uniformly dispersed within the protein component.

7. The method of claim 6 wherein at least one of the pairs of solubility parameter values are within 10% of each other.

8. The method of claim 6 where $\delta_1$ and $\delta_2$ are within 15% of each other.

9. The method of claim 6 wherein $\delta_{D1}$ and $\delta_{D2}$ are within 15% of each other.

10. The method of claim 6 further comprising calculating the free volume of the matched protein and plasticizer components in accordance with Formula (III)

$$FV = 0.025 + \alpha_d(T - Tg_d) + \alpha_p(T - Tg_p) \quad \text{(III)}$$

wherein

FV is the free volume, $\alpha_p$ is the coefficient of the thermal expansion of the protein component;

$\alpha_d$ is the coefficient of thermal expansion the plasticizer component;

T is a reference temperature;

$Tg_p$ is the glass transition temperature of the protein component; and $Tg_d$ is the glass transition temperature of the plasticizer component.

11. The method of claim 6 wherein the step of treating the blend comprises heating the blend at a temperature of from about 20° to 140° C. under controlled shear conditions.

12. The method of claim 11 comprising heating the blend at a temperature of from about 20° to 120° C.

13. The method of claim 11 comprising treating the blend in a closed mixer or extruder.

14. The method of claim 13 comprising contacting the blend with roller blades.

15. The method of claim 6 further comprising selecting a desired glass transition temperature for the plasticized proteinaceous material and selecting the amount of the protein component and plasticizer component in accordance with Formula (IV)

$$T_{gmix} = \frac{\alpha_d}{\alpha_p} \cdot V_d(Tg_d - Tg_p) + Tg_p \quad \text{(IV)}$$

wherein $T_{gmix}$=is the selected glass transition temperature of the plasticized proteinaceous material;

$\alpha_d$ is the coefficient of thermal expansion of the plasticizer component;

$\alpha_p$ is the coefficient of thermal expansion of the protein component;

$V_d$ is the volume fraction of the plasticizer component;

$Tg_d$ is the glass transition temperature of the plasticizer component; and $Tg_p$ is the glass transition temperature of the protein component.

16. The method of claim 6 wherein the amount of the protein component is at least 40% by weight based on the total weight of the blend.

17. The method of claim 16 wherein the amount of the protein component is at least 50% by weight based on the total weight of the blend.

18. The method of claim 17 wherein the amount of the protein component is from about 60 to 75% by weight based on the total weight of the blend.

19. The method of claim 6 wherein the protein component is water soluble.

20. The method of claim 6 wherein the protein component is water insoluble.

21. The method of claim 6 wherein the protein component is selected from the group consisting of grain proteins, animal proteins, egg proteins and milk proteins.

22. The method of claim 21 wherein the protein component is a grain protein selected from the group consisting of zein, glutenin, gliadin and mixtures thereof.

23. The method of claim 21 wherein the egg and milk protein components are selected from the group consisting of gelatin, egg albumin, lactalbumin, casein, sodium caseinate, whey and mixtures thereof.

24. The method of claim 6 wherein the plasticizer component is at least one organic plasticizer.

25. The method of claim 24 wherein the organic plasticizers are selected from the group consisting of propylene glycol, ethylene glycol, acetic acid, lactic acid, polypropylene glycol, polyethylene glycol, glycerol and ethanol and mixtures thereof.

26. The method of claim 19 further comprising reacting the water soluble protein with a cross-linking agent to form a water insoluble protein.

27. A plasticized proteinaceous material produced by the method of claim 6.

28. A plasticized proteinaceous material comprising a protein component and a plasticizer component wherein a solid state blend of the protein component and the plasticizer component have been heated under controlled shear conditions at a temperature of from about 20° C. to about 140° C. to form the plasticized proteinaceous material.

29. The plasticized proteinaceous material of claim 28 wherein the protein component includes zein, glutenin or gliadin.

30. The plasticized proteinaceous material of claim 28 wherein the plasticizer component is at least one organic plasticizer.

31. A method of forming a gum or confectionery composition comprising:

a) selecting a protein component;

b) determining the solubility parameter of the protein component defined by the Formula (I)

$$\delta_1{}^2 = \delta_{D1}{}^2 + \delta_{P1}{}^2 + \delta_{H1}{}^2 \quad \text{(I)}$$

wherein $\delta_1$ is the total solubility parameter value of the protein component;

$\delta_{D1}$ is the solubility parameter value contributed by dispersive forces of the protein component;

$\delta_{P1}$ is the solubility parameter value contributed by the polar forces of the protein component; and $\delta_{H1}$ is the solubility parameter value contributed by hydrogen bonding forces of the protein component;

c) selecting a plasticizer component by a second solubility parameter defined by the Formula (II)

$$\delta_2{}^2 = \delta_{D2}{}^2 + \delta_{P2}{}^2 + \delta_{H2}{}^2 \qquad (II)$$

wherein $\delta_2$ is the total solubility parameter value of the plasticizer component;

$\delta_{D2}$ is the solubility parameter value contributed by dispersive forces of the plasticizer component;

$\delta_{P2}$ is the solubility parameter value contributed by the polar forces of the plasticizer component; and $\delta_{H2}$ is the solubility parameter value contributed by hydrogen bonding of the plasticizer component;

wherein at least one of the following pairs of solubility parameter values $\delta_1-\delta_2$, $\delta_{D1}-\delta_{D2}$, $\delta_{P1}-\delta_{P2}$, and $\delta_{H1}-\delta_{H2}$ are within 15% of each other;

d) combining the matched protein and plasticizer components to form a blend;

e) treating the blend to form a plasticized proteinaceous material wherein the plasticizer is uniformly dispersed within the protein; and f) combining the plasticized proteinaceous material with other ingredients sufficient to form said gum or confectionery composition.

32. The method of claim 31 wherein the pairs of solubility parameter values are within 10% of each other.

33. The method of claim 31 wherein $\delta_1$ and $\delta_2$ are within 15% of each other.

34. The method of claim 31 wherein $\delta_{D1}$ and $\delta_{D2}$ are within 15% of each other.

35. The method of claim 31 further comprising calculating the free volume of the matched protein component and plasticizer component in accordance with Formula III $$FV = 0.025 + \alpha_d(T-Tg_d) + \alpha_p(T-Tg_p) \qquad (III)$$

wherein

FV is the free volume, $\alpha_p$ is the coefficient of the thermal expansion of the protein component;

$\alpha_d$ is the coefficient of thermal expansion the plasticizer component;

T is a reference temperature, $Tg_d$ is the glass transition temperature of the plasticizer component; and $Tg_p$ is the glass transition temperature of the protein component.

36. The method of claim 31 wherein the step of treating the blend comprises heating the blend at a temperature of from about 20° to 140° C. under controlled shear conditions.

37. The method of claim 26 comprising heating the blend at a temperature of from about 20° to 120° C.

38. The method of claim 36 comprising treating the blend in a closed mixer or extruder.

39. The method of claim 38 comprising contacting the blend with roller blades.

40. The method of claim 31 further comprising selecting a desired glass transition temperature for the plasticized proteinaceous material and selecting the amount of the protein component and plasticizer component in accordance with Formula (IV)

$$T_{gmix} = \frac{\alpha_d}{\alpha_p} \cdot V_d(Tg_d - Tg_p) + Tg_p \qquad (IV)$$

wherein $T_{gmix}$ = is the selected glass transition temperature of the plasticized proteinaceous material;

$\alpha_d$ is the coefficient of thermal expansion of the plasticizer component;

$\alpha_p$ is the coefficient of thermal expansion of the protein component;

$V_d$ is the volume fraction of the plasticizer component;

$Tg_d$ is the glass transition temperature of the plasticizer component; and $Tg_p$ is the glass transition temperature of the protein component.

41. The method of claim 40 wherein the amount of the protein component is at least 40% by weight based on the total weight of the blend.

42. The method of claim 41 wherein the amount of the protein component is at least 50% by weight based on the total weight of the blend.

43. The method of claim 42 wherein the amount of the protein component is from about 60 to 75% by weight on the total weight of the blend.

44. The method of the claim 31 wherein the protein component is water soluble.

45. The method of claim 31 wherein the protein component is water insoluble.

46. The method of claim 31 wherein the protein component is selected from the group consisting of grain proteins, animal proteins and egg and milk proteins.

47. The method of claim 46 wherein the grain proteins are selected from the group consisting of zein, glutenin, gliadin and mixtures thereof.

48. The method of claim 46 wherein the egg and milk proteins are selected from the group consisting of gelatin, egg albumin, lactalbumin, casein, sodium caseinate, whey and mixtures thereof.

49. The method of claim 31 wherein the plasticizer component is at least one organic plasticizer.

50. The method of claim 49 wherein the organic plasticizers are selected from the group consisting of propylene glycol, ethylene glycol, acetic acid, lactic acid, polypropylene glycol, polyethylene glycol, glycerol and ethanol.

51. The method of claim 44 further comprising reacting the water soluble protein with a cross-linking agent to form a water insoluble protein.

52. A gum produced by the method of claim 31.

53. The gum of claim 52 which is biodegradable, edible or both biodegradable and edible.

54. A confectionery composition produced by the method of claim 31.

* * * * *